(12) United States Patent
McElvain

(10) Patent No.: US 12,047,686 B2
(45) Date of Patent: Jul. 23, 2024

(54) ADAPTIVE IMAGE DATA LINEARIZATION FOR HDR IMAGE SENSORS

(71) Applicant: Dolby Laboratories Licensing Corporation, San Francisco, CA (US)

(72) Inventor: Jon Scott McElvain, Manhattan Beach, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 24 days.

(21) Appl. No.: 17/629,723

(22) PCT Filed: Aug. 11, 2020

(86) PCT No.: PCT/US2020/045821
§ 371 (c)(1),
(2) Date: Jan. 24, 2022

(87) PCT Pub. No.: WO2021/030375
PCT Pub. Date: Feb. 18, 2021

(65) Prior Publication Data
US 2022/0256071 A1    Aug. 11, 2022

Related U.S. Application Data

(60) Provisional application No. 62/885,458, filed on Aug. 12, 2019.

(30) Foreign Application Priority Data

Aug. 12, 2019 (EP) .................................... 19191257

(51) Int. Cl.
*H04N 23/741* (2023.01)
*G06T 5/00* (2006.01)
(Continued)

(52) U.S. Cl.
CPC ............. *H04N 23/741* (2023.01); *G06T 5/50* (2013.01); *G06T 2207/20208* (2013.01)

(58) Field of Classification Search
CPC ........ H04N 23/741; H04N 19/98; G06T 5/50; G06T 2207/20208; G06T 5/009; G06T 5/00; G06T 5/40
See application file for complete search history.

(56) References Cited

U.S. PATENT DOCUMENTS 7,433,514 B2 * 10/2008 Sloan ........................ G06T 5/50
382/167
8,165,395 B2    4/2012 Liu
(Continued)

FOREIGN PATENT DOCUMENTS

EP    3214600 B1    9/2017
EP    3306563 B1    1/2022
(Continued)

OTHER PUBLICATIONS

Fu, Q. et al "Adaptive Quantization-Based HDR Video Coding With HEVC Main 10 Profile" 2017 IEEE International Symposium on Multimedia (ISM) Date of publication: Dec. 2017.

*Primary Examiner* — Marly S Camargo

(57) ABSTRACT

A high-dynamic-range (HDR) camera module with adaptive image data linearization includes (i) an HDR image sensor configured to generate tone-compressed HDR images as respective frames that include active pixel data and metadata, (ii) a processor outside the HDR image sensor, and (iii) a memory outside the HDR image sensor and storing machine-readable instructions that, when executed by the processor, control the processor to: (a) extract, from a frame of a first tone-compressed HDR image, tone-compressed pixel intensities from the active pixel data and a histogram of pre-tone-compression pixel intensities from the metadata, (b) derive, from the tone-compressed pixel intensities and
(Continued)

the histogram, a correspondence between tone-compressed pixel intensities and pre-tone-compression pixel intensities, and (c) linearize at least a portion of the active pixel data of either the first tone-compressed HDR image or a subsequent tone-compressed HDR image, according to the correspondence, to produce a linearized HDR image.

23 Claims, 13 Drawing Sheets

(51) Int. Cl.
*G06T 5/50* (2006.01)
*H04N 19/98* (2014.01)

(56) References Cited

U.S. PATENT DOCUMENTS

| | | | |
|---|---|---|---|
| 8,189,073 B2 * | 6/2012 | Huang | H04N 1/4092 |
| | | | 348/235 |
| 8,339,475 B2 | 12/2012 | Atanassov | |
| 8,867,616 B2 | 10/2014 | Luo | |
| 9,264,681 B2 * | 2/2016 | Gish | G06F 3/1423 |
| 10,074,162 B2 * | 9/2018 | Imezeni | G06T 3/40 |
| 10,116,938 B2 | 10/2018 | Minoo | |
| 10,264,287 B2 | 4/2019 | Wen | |
| 10,271,060 B2 | 4/2019 | Guillotel | |
| 10,397,576 B2 * | 8/2019 | Kadu | H04N 19/182 |
| 11,734,806 B2 * | 8/2023 | Chiu | G06T 5/40 |
| 11,790,498 B1 * | 10/2023 | Zhang | G06T 5/40 |
| 2007/0053607 A1 * | 3/2007 | Mitsunaga | H04N 9/69 |
| | | | 382/274 |
| 2010/0226547 A1 | 9/2010 | Criminisi | |
| 2015/0294180 A1 | 10/2015 | Hong | |
| 2016/0104438 A1 * | 4/2016 | Han | G06T 5/40 |
| 2017/0048520 A1 * | 2/2017 | Seifi | H04N 19/103 |
| 2017/0085879 A1 | 3/2017 | Minoo | |
| 2017/0085889 A1 | 3/2017 | Baylon | |
| 2017/0257551 A1 | 9/2017 | Meuter | |
| 2017/0289555 A1 | 10/2017 | Su | |
| 2018/0007356 A1 | 1/2018 | Kadu | |
| 2018/0098094 A1 | 4/2018 | Wen | |
| 2018/0242006 A1 * | 8/2018 | Kerofsky | H04N 19/85 |
| 2019/0043176 A1 | 2/2019 | Li | |
| 2019/0110054 A1 | 4/2019 | Su | |
| 2019/0208173 A1 * | 7/2019 | Kadu | H04N 19/126 |
| 2023/0267579 A1 * | 8/2023 | Cauvin | G06T 5/40 |
| 2023/0325990 A1 * | 10/2023 | Sudret | G06T 5/40 |

FOREIGN PATENT DOCUMENTS

| | | |
|---|---|---|
| JP | 2003046859 A | 2/2003 |
| WO | 2018005705 W | 1/2018 |
| WO | 2018049335 A1 | 3/2018 |
| WO | 2018136432 A1 | 7/2018 |
| WO | 2019023202 A1 | 1/2019 |

* cited by examiner

2000

---

FOR A PARTIAL RANGE OF TONE-COMPRESSED PIXEL INTENSITIES EXCLUDING AN UPPERMOST RANGE OF THE TONE-COMPRESSED PIXEL INTENSITIES, DETERMINE A DIRECTLY-MATCHED-CORRESPONDENCE BETWEEN THE TONE-COMPRESSED PIXEL INTENSITIES AND THE PRE-TONE-COMPRESSION PIXEL INTENSITIES
2010

> EVALUATE AT LEAST ONE OF THE FIRST TONE-COMPRESSED IMAGE AND THE FIRST CUMULATIVE DISTRIBUTION FUNCTION TO DETERMINE A CUT-OFF TONE-COMPRESSED PIXEL INTENSITY THAT EXCLUDES SATURATED TONE-COMPRESSED PIXEL INTENSITIES
> 2012

> DEFINE THE PARTIAL RANGE AS A RANGE OF TONE-COMPRESSED PIXEL INTENSITIES NO GREATER THAN THE CUT-OFF TONE-COMPRESSED PIXEL INTENSITY
> 2013

> EVALUATE A HISTOGRAM, REPRESENTING ONLY A LOWER SUBSET OF FULL DYNAMIC RANGE, TO DETERMINE A CUT-OFF PRE-TONE-COMPRESSION PIXEL INTENSITY
> 2014
>
>> SET CUT-OFF PRE-TONE-COMPRESSION PIXEL INTENSITY TO MAXIMUM PIXEL INTENSITY OF THE HISTOGRAM
>> 2015

> DEFINE THE PARTIAL RANGE AS A NUMBER OF LOWEST TONE-COMPRESSED PIXEL INTENSITIES THAT EQUALS NUMBER OF PRE-TONE-COMPRESSION PIXEL INTENSITIES NO GREATER THAN THE CUT-OFF PRE-TONE-COMPRESSION PIXEL INTENSITY
> 2018

EXTRAPOLATE THE DIRECTLY-MATCHED-CORRESPONDENCE THROUGH THE UPPERMOST RANGE TO GENERATE THE CORRESPONDENCE
2020

| GENERATE THE CORRESPONDENCE AS A LOOK-UP TABLE 1032 | GENERATE THE CORRESPONDENCE AS A POLYNOMIAL FUNCTION 1034 | GENERATE THE CORRESPONDENCE AS A SPLINE REPRESENTATION 1036 |

FIG. 20

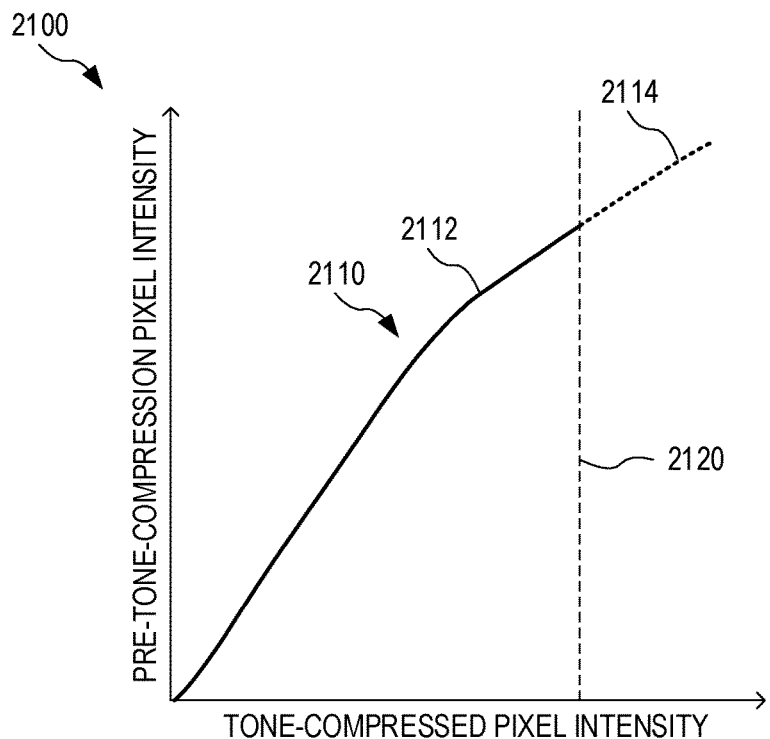

FIG. 21

```
                    2200
                      ↘
┌─────────────────────────────────────────────────────────────────────┐
│  COUNT NUMBER $N_{SAT}$ OF SATURATED PIXELS IN TONE-COMPRESSED HDR IMAGE │
│                              2210                                    │
└─────────────────────────────────────────────────────────────────────┘
                              ↓
┌─────────────────────────────────────────────────────────────────────┐
│ IDENTIFY BINS OF LOGARITHMIC PRE-TONE-COMPRESSION CONTAINING THE $N_{SAT}$ │
│        UPPERMOST PRE-TONE-COMPRESSION PIXEL INTENSITIES              │
│                              2220                                    │
└─────────────────────────────────────────────────────────────────────┘
                              ↓
┌─────────────────────────────────────────────────────────────────────┐
│                      CALCULATE AVERAGE BIN                           │
│                              2230                                    │
└─────────────────────────────────────────────────────────────────────┘
                              ↓
┌─────────────────────────────────────────────────────────────────────┐
│      LIMIT DIRECT MATCH TO BINS NO HIGHER THAN THE AVERAGE BIN       │
│                              2240                                    │
└─────────────────────────────────────────────────────────────────────┘
```

FIG. 22

ADAPTIVE IMAGE DATA LINEARIZATION FOR HDR IMAGE SENSORS

CROSS-REFERENCE TO RELATED APPLICATIONS

This application claims priority to U.S. Provisional Patent Application No. 62/885,458, filed 12 Aug. 2019, and European Patent Application No. 19191257.5, filed 12 Aug. 2019, both of which are incorporated herein by reference.

TECHNICAL FIELD

The present application relates to high-dynamic-range (HDR) image sensors, processing of image data generated by HDR image sensors, and the implementation of HDR image sensors and associated processing in mobile devices.

BACKGROUND

Numerous methods for high dynamic range (HDR) image capture have been developed over the past several decades. High-end camera systems, found mostly in the professional and scientific domain, typically employ large sensor pixels in conjunction with high bit-depth analog-to-digital conversion circuitry. By virtue of each sensor pixel being large, each sensor pixel has an intrinsically high dynamic range. Therefore, a raw image captured by such a high-end HDR camera system may provide HDR imagery in a single exposure of the sensor. Further aiding the performance of such systems, in both CCD and CMOS designs, readout noise levels have been reduced dramatically, thereby allowing for a single-exposure capture dynamic range exceeding 14 f-stops in high-end HDR camera systems.

The most widely used HDR cameras, however, are subject to both cost and space constraints, which preclude image sensors with large sensor pixels and high bit-depth analog-to-digital conversion circuitry. Most HDR cameras, such as those onboard mobile devices, instead utilize temporal or spatial multiplexing to capture two or more images of the same scene at two or more different exposure settings, respectively. In the case of two different exposure settings, a low-exposure image provides optimal image data for bright portions of the scene, while a high-exposure image provides optimal image data for dim portions of the scene. The low-exposure image and the high-exposure image are merged, post-capture, to generate an HDR image that spans a higher dynamic range than either one of the low-exposure image and the high-exposure image.

In temporally-multiplexed HDR imaging, the full pixel array is exposure twice, one time with a long exposure time and/or high gain and one time with a short exposure time and/or low gain. Temporally-multiplexed HDR imaging may utilize more than two different exposure settings to extend the dynamic range even further. Temporally-multiplexed HDR imaging may be carried out with a conventional non-HDR image sensor.

Spatially-multiplexed HDR imaging, on the other hand, utilizes an HDR-specific pixel array. Different subsets of the pixel array are configured to operate at different respective exposure settings, such that each frame captured by the pixel array includes images captured at the different exposure settings. For example, in the "zig-zag HDR" configuration, the pixel array layout consists of zig-zag lines of pixels, with the layout alternating between low-exposure zig-zag lines and high-exposure zig-zag lines. This layout is superimposed on the conventional Bayer color filter arrangement. In the "quad HDR" configuration, the conventional Bayer color filter arrangement is extended, such that each color filter sits atop a 2×2 pixel group (instead of atop a single pixel), where each 2×2 pixel group consists of one low-exposure pixel, two middle-exposure pixels, and one high-exposure pixel.

SUMMARY

In an embodiment, a high-dynamic-range (HDR) camera module with adaptive image data linearization includes an HDR image sensor for generating tone-compressed HDR images of a scene and configured to output the tone-compressed HDR images as respective frames that include active pixel data and metadata. The HDR camera module further includes a processor outside the HDR image sensor, and a memory outside the HDR image sensor. The memory stores machine-readable instructions that, when executed by the processor, control the processor to perform steps of (a) extracting, from a frame of a first tone-compressed HDR image generated by the HDR image sensor, (i) tone-compressed pixel intensities from active pixel data of the frame and (ii) a histogram of pre-tone-compression pixel intensities from metadata of the frame, (b) deriving, from the tone-compressed pixel intensities and the histogram, a correspondence between tone-compressed pixel intensities and pre-tone-compression pixel intensities, and (c) linearizing at least a portion of the active pixel data of a second tone-compressed HDR image, according to the correspondence, to produce a linearized HDR image, the second tone-compressed HDR image being selected from the group consisting of the first tone-compressed HDR image and a subsequent tone-compressed HDR image.

In an embodiment, an adaptive method for linearizing a tone-compressed HDR image includes (i) receiving, from an HDR image sensor, a frame of a first tone-compressed HDR image, (ii) extracting from the frame (a) tone-compressed pixel intensities from active pixel data of the frame and (b) a histogram of pre-tone-compression pixel intensities from metadata of the frame, (iii) deriving, from the tone-compressed pixel intensities and the histogram, a correspondence between tone-compressed pixel intensities and pre-tone-compression pixel intensities, (iv) receiving, from the HDR image sensor, a frame of a second tone-compressed HDR image, and (v) linearizing at least a portion of active pixel data of the frame of the second tone-compressed HDR image, according to the correspondence, to produce a linearized HDR image. The second tone-compressed HDR image is selected from the group consisting of the first tone-compressed HDR image and a subsequent tone-compressed HDR image.

BRIEF DESCRIPTION OF THE DRAWINGS

FIG. 20 is a flowchart for an adaptive method for determining a correspondence between tone-compressed and pre-tone-compression pixel intensities by deriving a directly-matched partial correspondence between the tone-compressed and pre-tone-compression pixel intensities and then extrapolating the directly-matched correspondence, according to an embodiment.

FIG. 21 is an example diagram illustrating certain elements of the method of FIG. 20.

FIG. 22 illustrates a method for determining a range for derivation of a directly-matched partial correspondence between the tone-compressed and pre-tone-compression pixel intensities, according to an embodiment.

DESCRIPTION OF EXAMPLE EMBODIMENTS

Figure 1:
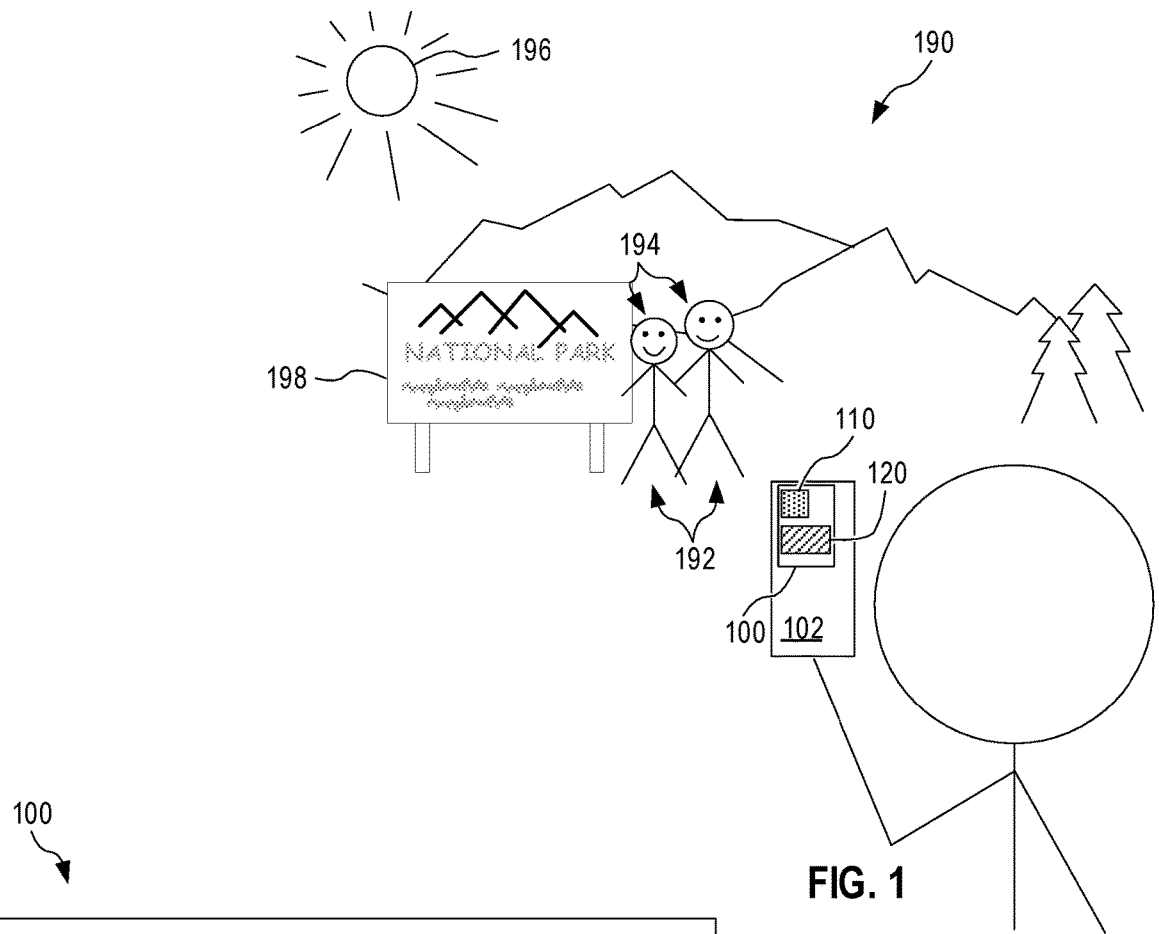
FIG. 1 illustrates, in an example use scenario, a high dynamic range (HDR) camera module with adaptive image data linearization, according to an embodiment.

FIG. 1 illustrates, in an example scenario, one high dynamic range (HDR) camera module 100 with adaptive image data linearization. HDR camera module 100 may be implemented in a mobile device 102, such as a mobile phone or tablet. More generally, the camera module 100 may be implemented in an electronic device. Example electronic devices in which the HDR camera module 100 may be implemented include (in addition to mobile devices such as mobile phones and tablets) camera devices, display devices, media players, gaming devices, laptops, and desktop computers. An electronic device may comprise a housing wherein the HDR camera module 100 is arranged in the housing. HDR camera module 100 includes an HDR image sensor 110 and a linearizer 120. HDR camera module 100 is configured to generate HDR imagery of a scene. The HDR imagery may be an HDR video stream or one or more HDR still images. HDR image sensor 110 may be a monochrome image sensor or a color image sensor. When HDR image sensor 110 is a color image sensor, each HDR image captured by HDR image sensor 110 includes a plurality of color components, for example red, green, and blue.

In the example scenario depicted in FIG. 1, HDR camera module 100 generates HDR imagery of a scene 190 that includes both bright areas (e.g., landscape lit by sun 196) and dim areas (e.g., faces 194 of people 192 backlit by sun 196, and the writing on sign 198 also backlit by sun 196). The dynamic range of a conventional non-HDR camera, for example with a bit depth of 8 or 10 bits, would likely be insufficient to capture both the bright areas and the dim areas of scene 190. Non-HDR images of scene 190 would therefore likely suffer from faces 194 and writing on sign 198 being underexposed and/or the landscape of scene 190 being overexposed. HDR camera module 100 is configured to capture HDR images with an extended dynamic range to better capture HDR scenes such as scene 190.

Figure 2:
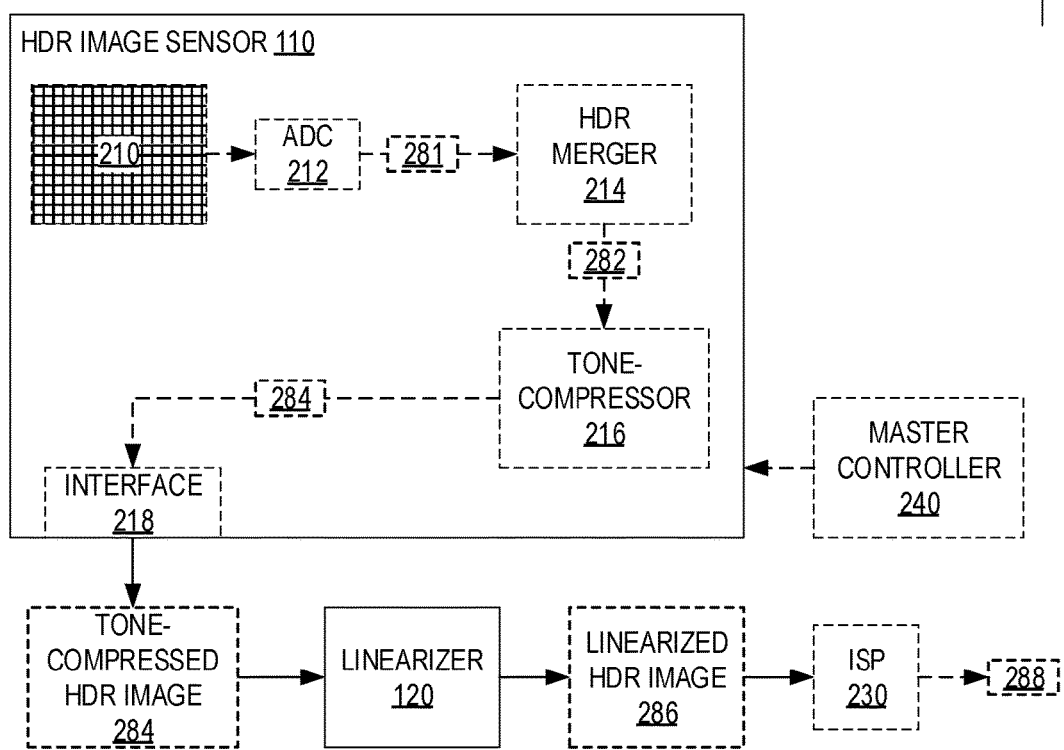
FIG. 2 shows the HDR camera module of FIG. 1 in further detail.

FIG. 2 shows HDR camera module 100 in further detail. HDR image sensor 110 is configured to generate HDR images 282 at an initial HDR bit depth. However, the output of HDR image sensor 110 is limited to an output bit depth that is less than the initial HDR bit depth, for example for compatibility with device communication protocols. HDR image sensor 110 therefore outputs tone-compressed HDR images 284. The pixel intensities of each tone-compressed HDR image 284 are the pixel intensities of HDR image 282 mapped to the output bit depth. Generally, the pixel intensities of tone-compressed HDR image 284 relate to actual scene intensities in a non-linear fashion, so as to optimally retain image information through the tone-compression process. Linearizer 120 is configured to re-linearize each tone-compressed HDR image 284 to produce a linearized HDR image 286 having pixel intensities that relate to actual scene intensities in an at least approximately linear fashion. Linearizer 120 may also map the pixel intensities of tone-compressed HDR image 284 to a higher bit depth, e.g., the first bit depth, such that the bit depth of linearized HDR image 286 exceeds the bit depth of tone-compressed HDR image 284. The bit depth of linearized HDR image 286 may equal the bit depth of pre-tone-compression HDR image 282.

Linearizer 120 does not require a priori knowledge of the tone-compression function used by HDR image sensor 110 to generate tone-compressed HDR images 284 from pre-tone-compression HDR images 282. Such a priori knowledge is often not available. Instead, linearizer 120 derives, from a frame of tone-compressed HDR image 284, a correspondence between tone-compressed pixel intensities and pre-tone-compression pixel intensities. Linearizer 120 may therefore adapt to changes in the tone-compression function used by HDR image sensor 110. In one scenario, HDR image sensor 110 dynamically adjusts the tone-compression function according to properties of the scene and/or capture settings. Linearizer 120 may include a processor and a non-transitory memory encoding machine-readable instructions that, when executed by the processor, control the processor to linearize tone-compressed HDR images 284 as discussed herein. Linearizer 120 may be implemented in a digital signal processor (DSP).

Figure 3:
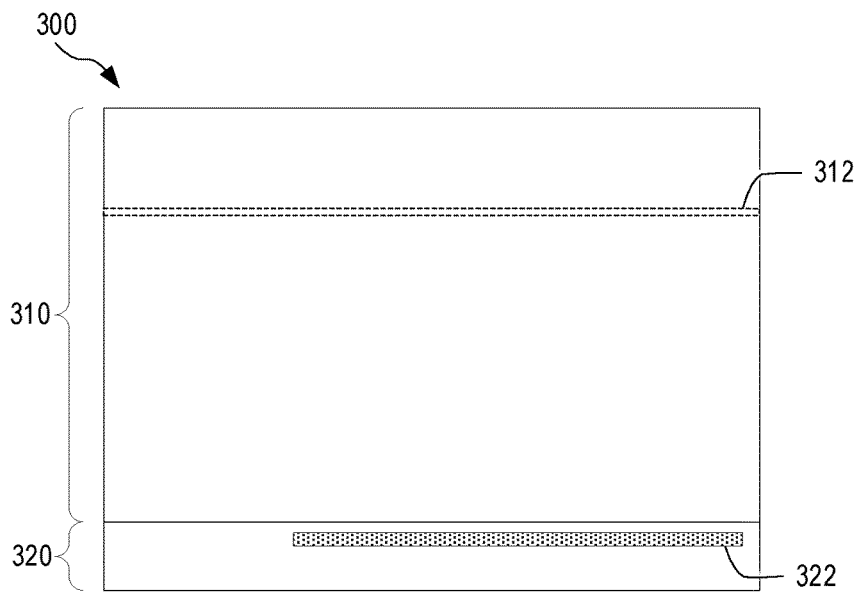
FIG. 3 shows a frame of a tone-compressed HDR image, according to an embodiment.

FIG. 3 shows a frame 300 of one tone-compressed HDR image 284. Frame 300 includes active pixel data 310 and metadata 320. Active pixel data 310 may include rows 312 of pixel intensities, wherein each row 312 corresponds to a pixel row of tone-compressed HDR image 284. Metadata 320 includes pre-tone-compression information 322, that is, information pertaining to pixel intensities of pre-tone-compression image 282. Pre-tone-compression information 322 may be statistical information, such as one or more full or partial histograms of pixel intensities of pre-tone-compression HDR image 282. The type of information included in metadata 320 may be configurable via a function call to HDR image sensor 110.

As used herein, the term "histogram" of an image denotes the distribution of pixel values of one or more-color components in the image across a number of "bins." For example, the number $N_b$ of bins may be equal to all possible values of a pixel (e.g., $N_b = 2^{bitdepth}$), where bitdepth denotes the pixel precision (e.g., 8-bits, 10-bits, and the like). In some embodiments, the number of bins may be less than $N_b$. For example, and without limitation, given $N_b$ bins and an image with P s(i) pixel values, a histogram hist[ ] of the image can be computed as follows:

```
for (b = 0 ; b < N_b; b++)
   hist [b] = 0;
   for (i = 0; i < P; i++)
{
     temp = fN_b (s [i] );
     hist [temp] = hist [temp] +1;
}
``` wherein $fN_b(x)$ denotes a function that maps the value of x into one of the $N_b$ bins. For example, when $N_b = 2^{bitdepth}$, $fN_b(x) = x$, or for arbitrary $N_b$ $$fN_b(x) = \text{floor}\left(x * \frac{N_b}{2^{bitdepth}}\right).$$

Given a histogram hist[ ] for an image, in an embodiment, a cumulative distribution function (CDF) of the image can be computed as:

```
CDF [0] = hist [0];
for (b = 1; b < N_b; b++)
   CDF [b] = CDF [b-1] + hist [b];
```

Referring again to FIG. 2, linearizer 120 processes a frame 300 of one tone-compressed HDR image 284, and compares pre-tone-compression information 322 with pixel intensities of active pixel data 310 to determine a correspondence between tone-compressed pixel intensities and pre-tone-compression pixel intensities. Linearizer 120 then applies this correspondence to the tone-compressed pixel intensities of active pixel data 310, of either the same frame 300 or another frame 300 associated with a subsequent tone-compressed HDR image 284, to linearize the tone-compressed pixel intensities of active pixel data 310. The resulting linearized pixel intensities are outputted in linearized HDR image 286.

HDR camera module 100 may include a master controller 240 that defines the type of information included in metadata 320, such that metadata 320 includes pre-tone-compression information 322. Master controller 240 may further control image capture by HDR image sensor 110.

FIG. 2 depicts one example implementation of HDR image sensor 110. In this implementation, HDR image sensor 110 includes a pixel array 210, an analog-to-digital converter (ADC) 212, an HDR merger 214, a tone-compressor 216, and an interface 218. For each exposure of pixel array 210, ADC 212 converts analog signals from pixel array 210 to digital image data 281. In one example, pixel array 210 is spatially-multiplexed and each exposure of pixel array 210 generates two or more images of the scene captured at two or more different exposure settings, respectively. Herein, an "exposure setting" refers to an exposure time, a gain, or a combination thereof. In this example, pixel array 210 may be a zig-zag HDR pixel array or a quad-HDR pixel array. In another example, HDR image sensor 110 is temporally multiplexed and configured to expose pixel array 210 two or more times at two or more different exposure settings, respectively. Regardless of whether HDR image sensor 110 utilizes spatial or temporal multiplexing, HDR merger 214 generates each pre-tone-compression HDR image 282 from digital image data 281 by merging two or more images of the scene captured at two or more different exposure settings, respectively. Tone-compressor 216 tone-compresses each HDR image 282 to produce tone-compressed HDR image 284. Interface 218 outputs tone-compressed HDR image 284.

In one implementation, the bit depth of digital image data 281 is 8 or 10 bits, the bit depth of each HDR image 282 is 14 or 16 bits, while interface 218 adheres to a Mobile Industry Parallel Interface (MIPI) standard with the output bit depth limited to 10 bits. In this implementation, tone-compressor 216 compresses the bit depth from 14 or 16 bits to 10 bits.

HDR camera module 100 may further include an image signal processor (ISP) 230. ISP 230 processes linearized HDR image 286 to produce a processed HDR image 288. ISP 230 may apply, to linearized HDR image 286, one or more procedures selected from the group consisting of white balancing, color correction, gamma correction, demosaicing, noise reduction, and image sharpening.

Tone-compressed HDR images 284 are, due to the generally non-linear relationship between tone-compressed pixel intensities and scene intensities, not suitable for display, especially if the tone compression is scene-dependent. Linearized HDR images 286, generated by linearizer 120, are display-ready or at least ready for processing by ISP 230. Although many camera modules include an ISP for processing of images outputted by an image sensor, these ISPs are (a) configured to process scene-linear pixel intensities (i.e., pixel intensities that relate to scene intensities in an at least approximately linear fashion) and (b) not configured to linearize tone-compressed pixel intensities where the tone compression is scene-dependent. In embodiments of HDR camera module 100 that include ISP 230, linearizer 120 functions as a necessary preprocessor that linearizes the pixel intensities prior to processing by ISP 230.

In a potential alternative solution, HDR image sensor 110 would be configured to output digital image data 281, prior to HDR merging by HDR merger 214, to perform HDR merging outside HDR image sensor 110. However, except for very high-end systems, typical mobile devices lack such off-sensor HDR merging capability and must therefore rely on tone-compression onboard the HDR image sensor. This potential alternative solution is therefore typically not a viable solution, at least for mobile devices.

To summarize certain advantages, linearizer 120 is capable of linearizing tone-compressed pixel intensities in camera modules that (a) lack off-sensor HDR merging capability and therefore must rely on HDR merging onboard the HDR image sensor and (b) impose a limit on the bit depth of the output of the HDR image sensor that is less than the HDR bit depth such that tone-compression is required. The linearization performed by linearizer 120 requires no a priori knowledge of the tone-compression function applied onboard the HDR image sensor. Instead linearizer 120 derives the necessary information from tone-compressed HDR image frames outputted by the HDR image sensor. This feature of linearizer 120 enables linearizer 120 to adapt to dynamic changes in the tone-compression function applied onboard the HDR image sensor.

Without departing from the scope hereof, linearizer 120 may be provided as a standalone product configured for implementation in a camera module together with an HDR image sensor 110 provided by a third party and, optionally, together with an ISP 230 and/or a master controller 240 provided by a third-party.

Figure 4:
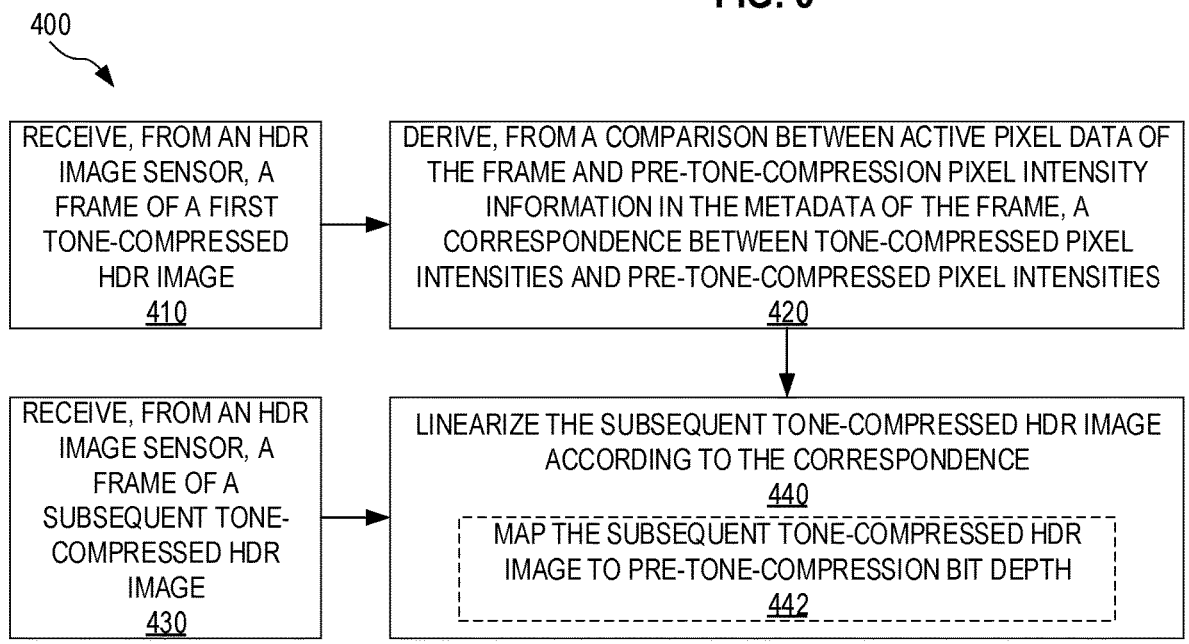
FIG. 4 illustrates an adaptive method for linearizing a tone-compressed HDR image, according to an embodiment.

FIG. 4 illustrates one adaptive method 400 for linearizing a tone-compressed HDR image. Method 400 may be performed by linearizer 120. Method 400 includes steps 410, 420, 430, and 440.

Step 410 receives a frame of a first tone-compressed HDR image from an HDR image sensor. In one example of step 410, linearizer 120 receives a frame 300 of a first tone-compressed image 284 from HDR image sensor 110.

Step 420 derives, from a comparison between active pixel data of the frame and pre-tone-compression pixel intensity information in the metadata of the frame, a correspondence between tone-compressed pixel intensities and pre-tone-compressed pixel intensities. In one example of step 420, linearizer 120 compares active pixel data 310 and pre-tone-compression information 322 of a frame 300 of the first tone-compressed image 284. From this comparison, linearizer 120 derives a correspondence between tone-compressed pixel intensities of the first tone-compressed image 284 and pre-tone-compression pixel intensities of pre-tone-compression HDR image 282. The comparison performed in step 420 may consider all tone-compressed pixel intensities of the first tone-compressed image.

Step 430 receives a frame of a subsequent tone-compressed HDR image from the HDR image sensor. This subsequent tone-compressed HDR image is captured after the first tone-compressed HDR image received in step 410. In one example of step 430, linearizer 120 receives a frame 300 of another tone-compressed image 284 based on a pre-tone-compression HDR image 282 captured by HDR image sensor 110 subsequently to the pre-tone-compression HDR image 282 associated with the tone-compressed image 284 received in step 410.

Step 440 linearizes the subsequent tone-compressed HDR image, received in step 430, according to the correspondence derived in step 420. In one example of step 440, linearizer 120 linearizes the tone-compressed pixel intensities of the subsequent tone-compressed HDR image 284, received in step 430, according to the correspondence derived in step 420, to generate linearized HDR image 286. Step 440 may include a step 442 of mapping the second tone-compressed HDR image to the pre-tone-compression bit depth (or to another bit depth that exceeds the bit depth of the first tone-compressed HDR image).

Method 400 is particularly well-suited for linearization of a tone-compressed HDR video stream where there is limited time and/or memory available for processing of each frame. When used to linearize a tone-compressed HDR video stream, method 400 may be applied to each tone-compressed HDR image of the video stream, and linearize each tone-compressed HDR image of the video stream according to a correspondence determined for the previous tone-compressed HDR image of the video stream. Video processing is often subject to time constraints where all processing must be done at a frame rate that matches the capture frame rate.

In one example scenario, linearizer 120 linearizes frames 300 of each tone-compressed image 284 of a tone-compressed HDR video stream "on the fly". For each frame 300 in this scenario, linearizer 120 (a) serially receives and linearizes different subsets of frame 300 according to a correspondence derived from an immediately preceding frame 300 of the tone-compressed HDR video stream, while synchronously therewith (b) serially extracting, from each of the different subset, the tone-compressed pixel intensities of active pixel data 310. Upon completion of this serial processing, linearizer has collected data for performing step 420 and proceeds to determine a correspondence that will be applied to the next frame 300 of the tone-compressed HDR video stream. It is understood that the tone-compressed pixel intensities collected to perform step 420 may be collected at a reduced resolution. In one example, the tone-compressed pixel intensities are binned in predefined histogram bins, such that linearizer 120 only needs to count the number of pixels in each bin rather than store the exact tone-compressed pixel intensities for each pixel.

Figure 5:
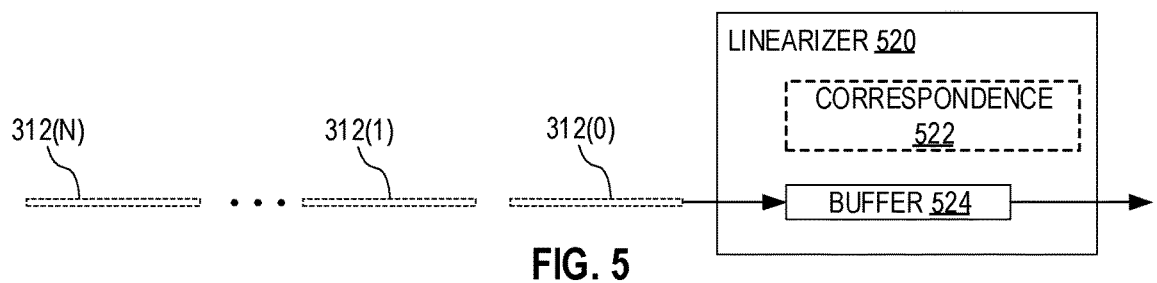
FIG. 5 illustrates a linearizer for adaptive linearization of a tone-compressed HDR video stream, according to an embodiment.

FIG. 5 illustrates one linearizer 520 for adaptive linearization of a tone-compressed HDR video stream. Linearizer 520 is configured to perform an embodiment of method 400. Linearizer 520 includes a buffer 524 capable of storing a row 312 of tone-compressed pixel intensities of frame 300 of tone-compressed HDR image 284. For each tone-compressed HDR image 284, linearizer 520 serially stores all N rows 312 to buffer 524, one row 312 after the other. Each row 312 is processed according to step 440 based upon a correspondence 522 derived from the preceding tone-compressed HDR image 284, and to collect data for step 420 in an iteration of method 400 serving to linearize the subsequent tone-compressed HDR image 284. After processing of all rows 312, linearizer 520 extracts pre-tone-compression information 322 from metadata 320 and completes step 420 to update correspondence 522.

Without departing from the scope hereof, buffer 524 may be capable of storing a block of several rows 312, such that linearizer 520 serially processes blocks of rows 312 instead of serially processing individual rows 312.

Figure 6:
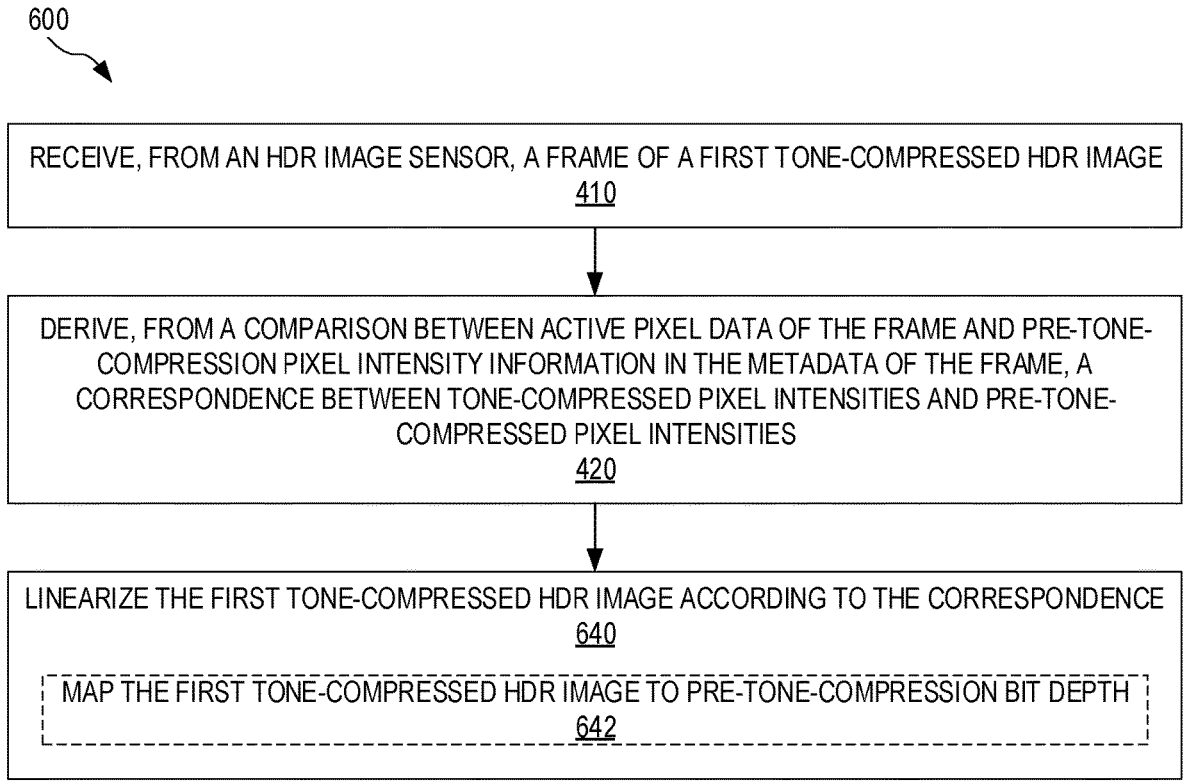
FIG. 6 illustrates another adaptive method for linearizing a tone-compressed HDR image, according to an embodiment.

FIG. 6 illustrates another adaptive method 600 for linearizing a tone-compressed HDR image. Method 600 may be performed by linearizer 120. Method 600 first performs steps 410 and 420, as discussed above in reference to FIG. 4. After determining the correspondence in step 420 based upon the first tone-compressed image, a step 640 linearizes the first tone-compressed image according to the correspondence. Step 640 is similar to step 440, except that step 640 applies the correspondence to linearization of the same tone-compressed HDR image from which the correspondence has been derived. Step 640 may include a step 642 of mapping the first tone-compressed HDR image to the pre-tone-compression bit depth (or to another bit depth that exceeds the bit depth of the first tone-compressed HDR image). Method 600 is particularly suitable for processing of tone-compressed HDR still images. Still image processing typically is less time-constrained than video stream processing, thus allowing for processing of full frames rather than on-the-fly serial processing of subsets (e.g., rows) of each frame.

Figure 7:
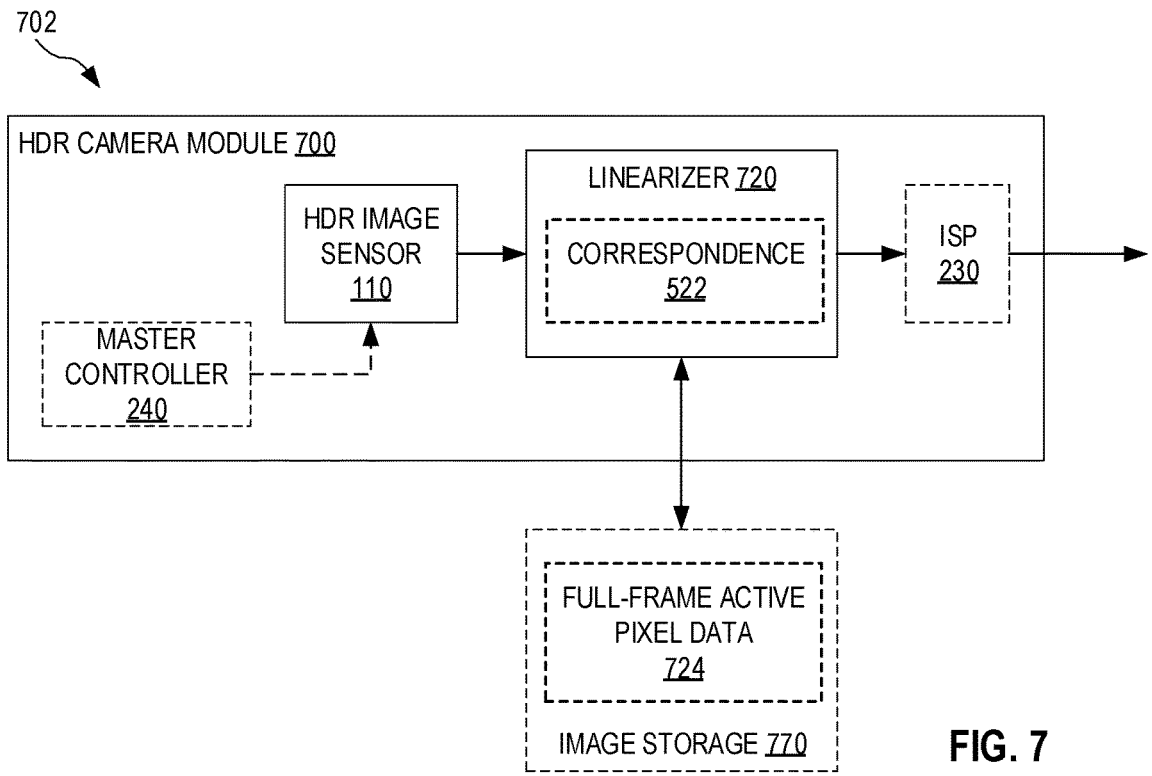
FIG. 7 illustrates a HDR camera module configured to linearize each tone-compressed HDR image, generated by an image sensor of the HDR camera module of FIG. 7, based upon the tone-compressed HDR image itself, according to an embodiment.

FIG. 7 illustrates one HDR camera module 700 configured to linearize each tone-compressed HDR image, generated by an image sensor of the HDR camera module 700, based upon the tone-compressed HDR image itself. HDR camera module 700 includes HDR image sensor 110 and a linearizer 720. HDR camera module 700 may further include one or both of ISP 230 and master controller 240. HDR camera module 700 is an embodiment of HDR camera module 100, and linearizer 720 is an embodiment of linearizer 120.

Linearizer 720 is configured to perform an embodiment of method 600. Linearizer 720 is communicatively coupled with an image storage 770 capable of storing a full frame 724 of active pixel data 310 of a frame 300 of a tone-compressed HDR image 284. In operation, linearizer 720 receives frame 300 in step 410 of method 600, and stores all active pixel data 310 of frame 300 in image storage 770 as full frame 724. In step 420 of method 600, linearizer 720 derives correspondence 522 from frame 300. Next, in step 640 of method 600, linearizer 720 retrieves full frame 724 from image storage 770 and linearizes the tone-compressed pixel data thereof according to correspondence 522. Linearizer 720 may utilize image storage 770 for storage of part of all of linearized HDR image 286 before outputting linearized HDR image 286.

HDR camera module 700 may be implemented in a mobile device 702 together with image storage 770. In one example, mobile device 702 is a mobile phone, or tablet, having memory outside HDR camera module 700, where this memory has several functions including serving as image storage 770. This memory may be random-access memory (RAM) or a solid state drive (SSD). Without departing from the scope hereof, image storage 770 may instead be implemented onboard HDR camera module 700. The HDR camera module 700 may more generally be implemented in an electronic device (e.g. of any of the types discussed in connection with FIG. 1) together with image storage 770.

Figure 8:
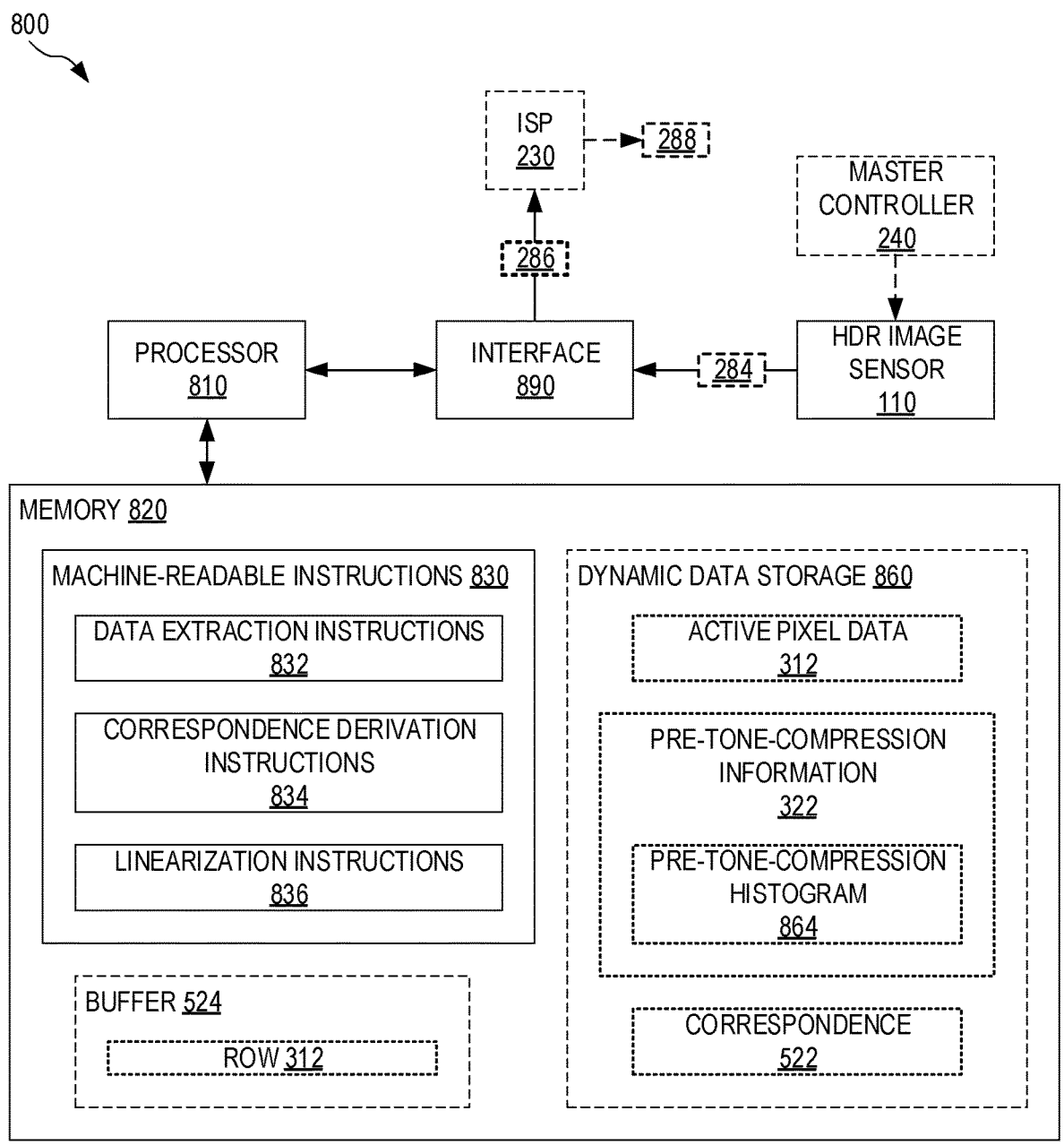
FIG. 8 illustrates a HDR camera module with machine-readable instructions for adaptive image data linearization, according to an embodiment.

FIG. 8 illustrates one HDR camera module 800 with machine-readable instructions for adaptive image data linearization. HDR camera module 800 includes a processor 810, a non-transitory memory 820, an interface 890, and HDR image sensor 110. HDR camera module 800 is an embodiment of HDR camera module 100 and may include one or both of ISP 230 and master controller 240. Processor 810 and memory 820 cooperate to form an embodiment of linearizer 120. Memory 820 includes machine-readable instructions 830. Processor 810 and memory 820 may be implemented in a digital signal processor. Machine-readable instructions 830 include data extraction instructions 832, correspondence derivation instructions 834, and linearization instructions 836.

Upon execution by processor 810, data extraction instructions 832 control processor 810 to extract data from frame 300 of tone-compressed HDR image 284 received from HDR image sensor 110 via interface 890. Specifically, processor 810 extracts (a) tone-compressed pixel intensities from active pixel data 310 and pre-tone-compression information 322 from metadata 320. In one embodiment, memory 820 includes buffer 524, and processor 810 utilizes buffer 524 for storage of rows 312 of active pixel data 310, for example as discussed above in reference to FIG. 5. In another embodiment, not shown in FIG. 8, HDR camera module 800 is communicatively coupled with image storage 770 via interface 890, and processor 810 utilizes image storage 770 for storage of active pixel data 310, for example as discussed above in reference to FIG. 7. In yet another embodiment, memory 820 includes a dynamic data storage 860, and processor 810 utilizes dynamic data storage 860 for storage of active pixel data 310 and/or pre-tone-compression information 322.

Upon execution by processor 810, correspondence derivation instructions 834 control processor 810 to derive, from a comparison between active pixel data 310 and pre-tone-compression information 322, correspondence 522. Processor 810 may store correspondence 522 to dynamic data storage 860.

Upon execution by processor 810, linearization instructions 836 control processor 810 to linearize tone-compressed HDR image 284 so as to generate linearized HDR image 286. Linearization instructions 836 may control processor 810 to output linearized HDR image 286 via interface 890. Processor 810 may utilize buffer 524, dynamic data storage 860, and/or image storage 770 (not shown in FIG. 8) for storage of tone-compressed and/or linearized pixel intensities during execution of linearization instructions 863.

Figure 9:
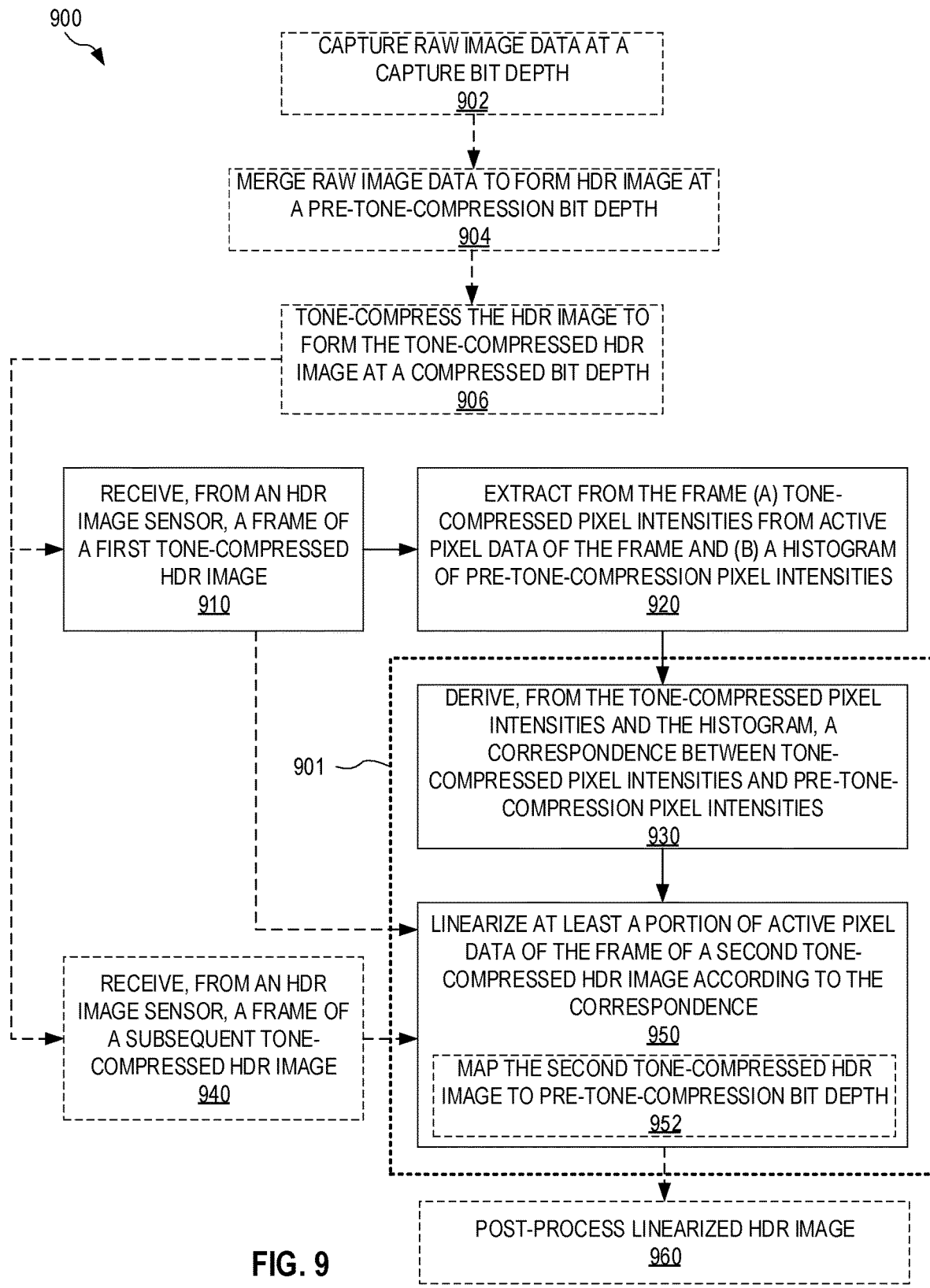
FIG. 9 illustrates yet another adaptive method for linearizing a tone-compressed HDR image, according to an embodiment.

FIG. 9 illustrates yet another adaptive method 900 for linearizing a tone-compressed HDR image. Method 900 includes steps 910, 920, 930, and 950. Method 900 may be performed by HDR camera module 800.

Step 910 receives, from an HDR image sensor, a frame of a first tone-compressed HDR image. In one example of step 910, processor 810 receives frame 300 of tone-compressed HDR image 284 from HDR image sensor 110 via interface 890.

Step 920 extracts, from the frame received in step 410, (a) tone-compressed pixel intensities from active pixel data of the frame and (b) a histogram of pre-tone-compression pixel intensities provided in metadata of the frame. In one example of step 920, processor 810 executes data extraction instructions 832 to (a) extract tone-compressed pixel from active pixel data 310 and (b) extract a pre-tone-compression histogram 864 (see FIG. 8) from metadata 320. Pre-tone-compression histogram 864 is an example of pre-tone-compression information 322, or included in pre-tone-compression information 322. Pre-tone-compression histogram 864 is a histogram of pixel intensities of pre-tone-compression HDR image 282. Pre-tone-compression histogram 864 may represent all pixels of pre-tone-compression HDR image 282, or a subset of pixels of pre-tone-compression HDR image 282. For HDR color images, pre-tone-compression histogram 864 may be a luminance histogram.

Step 930 derives, from the tone-compressed pixel intensities and the pre-tone-compression histogram, a correspondence between tone-compressed pixel intensities and pre-tone-compression pixel intensities. In one example of step 930, processor 810 executes correspondence derivation instructions 834 to determine correspondence 522.

Step 950 linearizes at least a portion of active pixel data of the frame of a second tone-compressed HDR image according to the correspondence derived in step 930, thereby generating a linearized HDR image. In one example of step 940, processor 810 executes linearization instructions 836 to linearize tone-compressed HDR image 284 according to correspondence 522, thereby generating linearized HDR image 286. The second tone-compressed HDR image is either (a) the first tone-compressed HDR image or (b) a subsequent tone-compressed HDR image captured by the HDR image sensor after capture of the first tone-compressed HDR image received in step 910. The first and subsequent tone-compressed HDR images may be consecutive images of a tone-compressed HDR video stream.

When used to linearize a tone-compressed HDR video stream, method 900 may further include a step (not shown in FIG. 9) of limiting temporal variation, through the video stream, in the correspondence determined in step 930. Such a step may serve to prevent visually apparent discrete changes from frame to frame in the linearized video stream. In one implementation, performed between steps 930 and 950 for each tone-compressed HDR image of the video stream, method 900 evaluates deviations between (a) the correspondence determined in step 930 for the currently processed first tone-compressed HDR image and (b) the correspondence determined in step 930 for an immediately preceding first tone-compressed HDR image. If a deviation exceeds a threshold value, the correspondence for the currently processed first tone-compressed HDR image is modified to more closely resemble the correspondence for the immediately preceding first tone-compressed HDR image such that no deviations exceeds the threshold value. The threshold value may be defined as a maximum allowed relative difference, for each value of the tone-compressed pixel intensity, between (a) a pre-tone-compression pixel intensity according to the correspondence for the currently processed first tone-compressed HDR image and (b) a pre-tone-compression pixel intensity according to the correspondence for the immediately preceding first tone-compressed HDR image. The maximum allowed relative difference is, for example in the range between one and ten percent.

In one embodiment, step 950 linearizes all tone-compressed pixel intensities of the second tone-compressed HDR image according to a correspondence derived from a consideration of all tone-compressed pixel intensities of the first tone-compressed HDR image in step 930. In another embodiment, step 950 linearizes pixel intensities in a spatial sub-region of the second tone-compressed HDR image, according to a correspondence derived from a consideration of tone-compressed pixel intensities of that same spatial sub-region of the first tone-compressed HDR image in step 930.

In embodiments where step 950 linearizes the first tone-compressed HDR image, steps 910, 920, 930, and 950 cooperate to form an embodiment of method 600. In embodiments where step 950 linearizes a subsequent tone-compressed HDR image, method 900 further includes a step 940, and steps 910, 920, 930, 940, and 950 cooperate to form an embodiment of method 400. Step 940 receives, from an HDR image sensor, a frame of a subsequent tone-compressed HDR image. In one example of step 940, processor 810 receives frame 300 of a subsequent tone-compressed HDR image 284 from HDR image sensor 110 via interface 890, wherein the subsequent tone-compressed HDR image 284 has been captured after the first tone-compressed HDR image 284.

In certain embodiments, method 900 further includes steps 902, 904, and 906, each of which may be performed by an HDR image sensor such as HDR image sensor 110. Step 902 captures raw image data at a capture bit depth. In one example of step 902, pixel array 210 (in cooperation with ADC 212) captures digital image data 281. Step 904 merges the raw image data to form an HDR image at a pre-tone-compression bit depth. In one example of step 904, HDR merger 214 merges digital image data 281, obtained at two or more different exposure settings, to form pre-tone-compression HDR image 282. Step 906 tone-compresses the HDR image, formed in step 904, to a compressed bit depth that is less than the pre-tone-compression bit depth. In one example of step 906, tone-compressor 216 tone-compresses pre-tone-compression HDR image 282 to generate tone-compressed HDR image 284.

Method 900 may further include a step 960 of post-processing the linearized HDR image generated in step 950. Step 960 may apply one or more processes to the linearized HDR image, for example one or more of white balancing, color correction, gamma correction, demosaicing, noise reduction, and image sharpening. In one example of step 960, ISP 230 processes linearized HDR image 286.

Embodiments of method 900 that do not include any of steps 902, 904, 906, and 960 may be performed by linearizer 120, for example implemented as processor 810 and memory 820.

Figure 10:
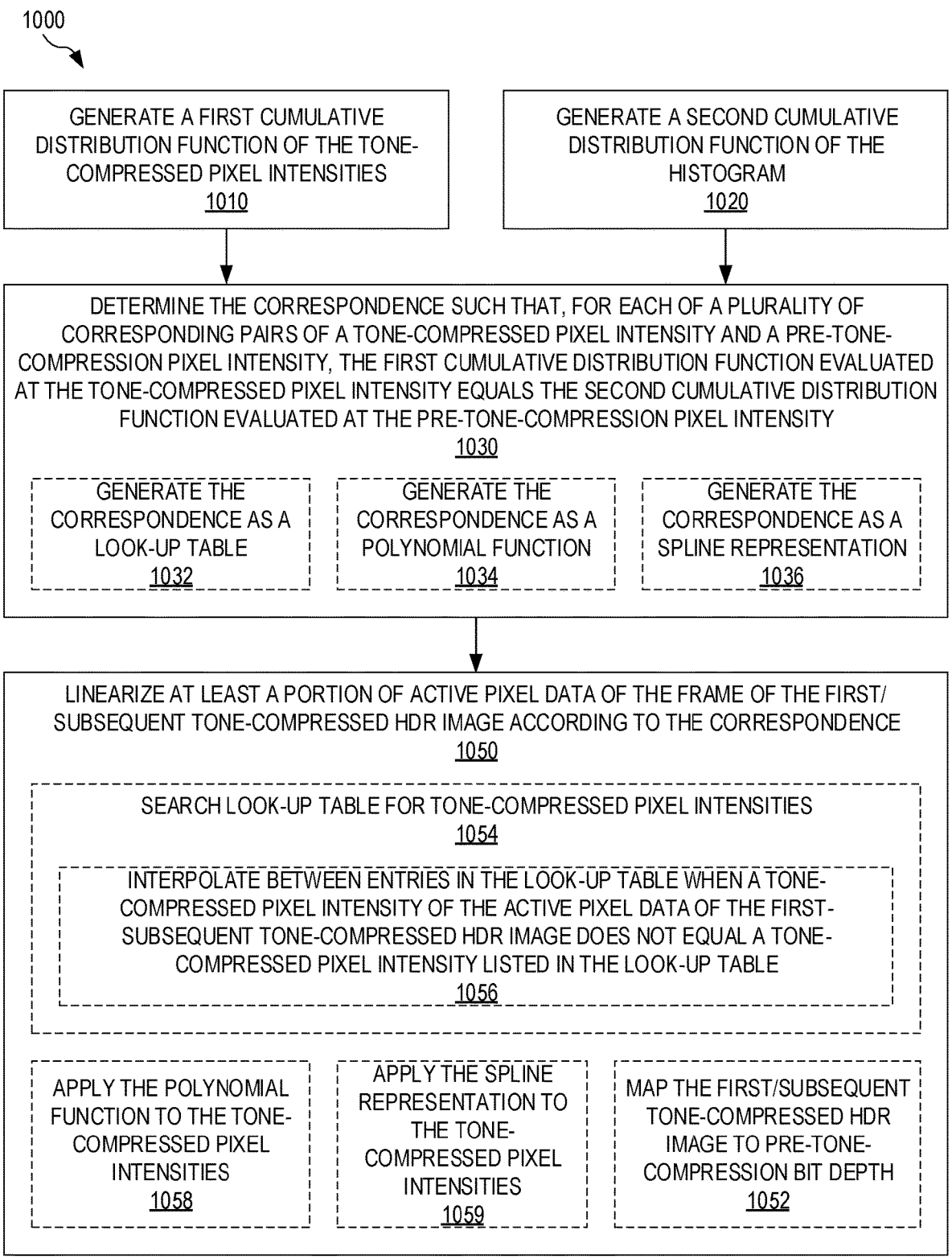
FIG. 10 is a flowchart for an adaptive method for linearizing a tone-compressed HDR image based upon cumulative distribution functions, according to an embodiment.
Figure 11:
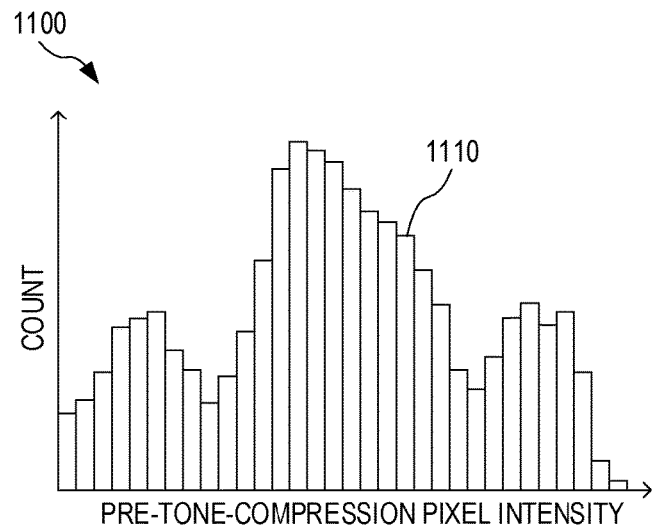
FIGS. 11-13 are example diagrams of certain elements of the method of FIG. 10.
Figure 12:
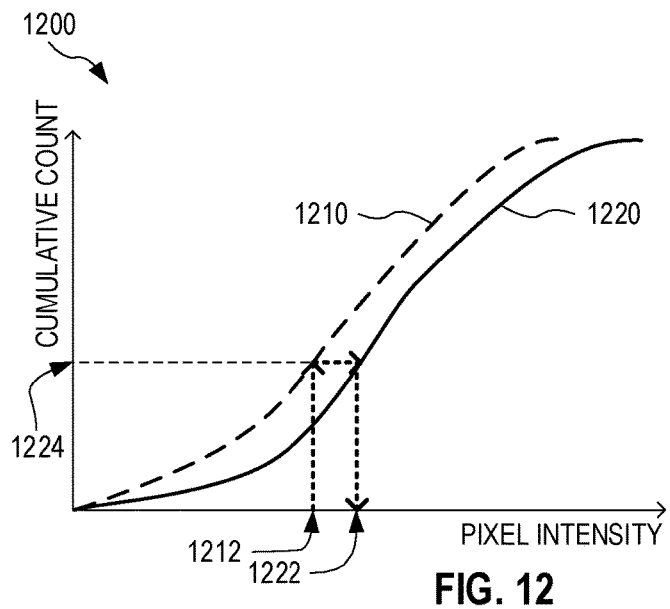
Figure 13:
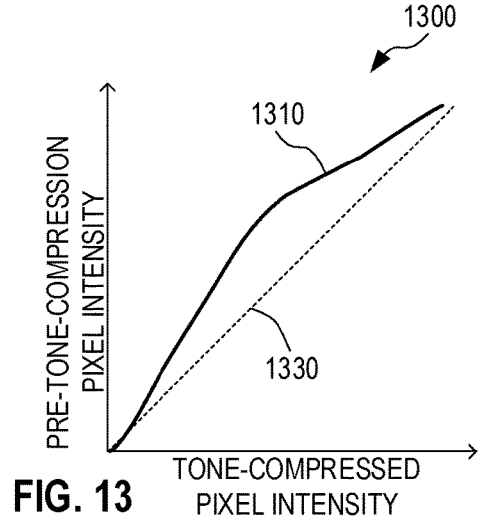

FIGS. 10-13 illustrate one adaptive method 1000 for linearizing a tone-compressed HDR image based upon cumulative distribution functions (CDFs). FIG. 10 is a flowchart for method 1000, and FIGS. 11-13 are example diagrams of certain elements of method 1000. FIGS. 10-13 are best viewed together in the following description.

Method 1000 is an embodiment of portion 901 of method 900 (see FIG. 9). Method 1000 may be performed by linearizer 120, for example implemented as processor 810 and memory 820. Method 1000 includes steps 1010, 1020, 1030, and 1050. Steps 1010, 1020, and 1030 cooperate to form an embodiment of step 930, of method 900, that may be encoded in correspondence derivation instructions 834. Step 1050 is an embodiment of step 950 of method 900 and may be encoded in linearization instructions 836.

Step 1010 generates a first CDF of the tone-compressed pixel intensities obtained in step 920. In one example of step 1010, step 1010 generates a CDF 1210 (see FIG. 12) of tone-compressed pixel intensities of active pixel data 310. CDF 1210 may be based upon all tone-compressed pixel intensities of active pixel data 310, or a subset of the tone-compressed pixel intensities of active pixel data 310. The first CDF may be generated by (a) binning the tone-compressed pixel intensities into $N_C$ bins $B_{C,i}$, wherein i=0, 1, . . . , $N_C$−1 and each bin $B_{C,i}$ corresponds to a tone-compressed pixel intensity $V_{C,i}$ and has a count $f(V_{C,i})$, and (b) calculating the first CDF as $$\mathrm{CDF}_C(V_{C,j}) = \Sigma_{i=0}^{j} f(V_{C,i}),$$

wherein j=0, 1, . . . , $N_C'$−1, and wherein $N_C'$ is the same as $N_C$ or $N_C'$ corresponds to the highest bin $B_{C,i}$ with a non-zero count. $V_{C,i}$ may indicate a center value of a range of tone-compressed pixels assigned to bin $B_{C,i}$ or an upper limit for tone-compressed pixels assigned to bin $B_{C,i}$. In one implementation, the first value of $\mathrm{CDF}_C(V_{C,j})$ is calculated first for the first bin $B_{C,0}$ according to the equation $\mathrm{CDF}_C(V_{C,0}) = f(V_{C,0})$, and each subsequent value of $\mathrm{CDF}_C(V_{C,j})$ is then calculated as $$\mathrm{CDF}_C(V_{C,j}) = \mathrm{CDF}_C(V_{C,j-1}) + f(V_{C,j}).$$

Step 1020 generates a second CDF of the histogram of pre-tone-compression pixel intensities obtained in step 920. FIG. 11 shows one example histogram 1100, where HDR image sensor 110 has binned pre-tone-compression pixel intensities of pre-tone-compression HDR image 282 in bins 1110. FIG. 12 shows (schematically) a CDF 1220 of histogram 1100. Step 1020 may calculate the second CDF, $\mathrm{CDF}_P$, from the histogram of the pre-tone-compression pixel intensities, in a manner similar to the calculation of the first CDF from a histogram of tone-compressed pixel intensities, as discussed above in reference to step 1010.

Step 1030 determines a correspondence between tone-compressed pixel intensities and pre-tone-compression pixel intensities such that, for each of a plurality of corresponding pairs of a tone-compressed pixel intensity and a pre-tone-compression pixel intensity, the first CDF evaluated at the tone-compressed pixel intensity equals the second CDF evaluated at the pre-tone-compression pixel intensity. In other words, for any instance $u_C(i)$ of the tone-compressed pixel intensities, the corresponding pre-tone-compressed pixel intensity $v_P$ is determined as a pre-tone-compressed pixel intensity that fulfils the equation $$CDF_C(u_C(i))=CDF_P(v_P).$$

The correspondence determined by step 1030 is an example of correspondence 522.

FIG. 12 provides a visual example diagram 1200 of this correspondence, as determined from CDFs 1210 and 1220. For each of a plurality of tone-compressed pixel intensities, step 1030 seeks to determine a pre-tone-compressed pixel intensity associated with the same CDF value. Diagram 1200 considers a tone-compressed pixel intensity 1212 of tone-compressed HDR image 284. The value of CDF 1210 at tone-compressed pixel intensity 1212 is CDF value 1224. With the knowledge of CDF value 1224, it is possible to read, from diagram 1200 by following the dashed arrows, a pre-tone-compression pixel intensity 1222 of pre-tone-compression HDR image 282 that corresponds to CDF 1220 attaining CDF value 1224. As an example, if tone-compressed pixel intensity 1212 is the 574$^{th}$ brightest tone-compressed pixel intensity, pre-tone-compression pixel intensity 1222 is at least approximately the 574$^{th}$ brightest pre-tone-compression pixel intensity. Finite binning resolution in histogram 1100 may result in deviations from an exact match between tone-compressed pixel intensity 1212 and pre-tone-compression pixel intensity 1222. It is understood that diagram 1200 is intended for explanatory purposes, and that step 1030 may be performed numerically and without visually reading a diagram. It is further understood that CDF 1210 and/or CDF 1220 may increase in a stepwise fashion, as opposed to a smooth fashion. For example, CDF 1220 may have one step for each bin 1110. In such cases, interpolation between adjacent steps of CDF 1220 may be used to determine pre-tone-compression pixel intensity 1222, for example as discussed below in reference to FIG. 15. Continuing with diagram 1200 as a visual example, step 1030 considers several different tone-compressed pixel intensities 1212 and finds the corresponding pre-tone-compression pixel intensities 1222.

When method 1000 is used for monochrome image processing, pixel intensities throughout method 1000 are grayscale intensities. When method 1000 is used for color image processing, the pixel intensities processed in method 1000 may be (a) color-specific pixel intensities (e.g., red, green, and blue pixel intensities), (b) luminance formed by combining different types of color-specific pixel intensities, or (c) a combination of color-specific pixel intensities and luminance. In one example, CDFs 1210 and 1220 both represent luminance. In another example, CDFs 1210 and 1220 represent color-specific pixel intensities for the same, single color component (e.g., green). In yet another example, CDF 1210 represents color-specific pixel intensities for a single color component, while CDF 1220 represents luminance Certain embodiments of method 1000, specifically tailored to color image processing, are discussed below in reference to FIGS. 16-19.

FIG. 13 is a diagram 1300 of an example correspondence 1310, determined in step 1030, which shows pre-tone-compression pixel intensity as a function of tone-compressed pixel intensity. In this example, the pre-tone-compression pixel intensity is generally greater than the tone-compressed pixel intensity, with correspondence 1310 being above the 1:1 correspondence indicated by dashed line 1330.

Step 1030 may include one of steps 1032, 1034, and 1036. Step 1032 generates the correspondence as a look-up table. The look-up table lists a plurality of pairs of corresponding tone-compressed and pre-tone-compression pixel intensities, e.g., pairs of tone-compressed pixel intensities 1212 and pre-tone-compression pixel intensities 1222 corresponding to the same CDF value. Step 1034 generates the correspondence as a polynomial function. Step 1034 may determine this polynomial function by fitting to the plurality of pairs of corresponding tone-compressed and pre-tone-compression pixel intensities. Step 1036 generates the correspondence as a spline representation having a plurality of polynomial segments. The polynomial segments may be quadratic or cubic. Step 1036 may determine this spline representation by spline interpolation between the plurality of pairs of corresponding tone-compressed and pre-tone-compression pixel intensities.

Step 1050 linearizes at least a portion of the active pixel data of the frame of the first or subsequent tone-compressed HDR image according to the correspondence determined in step 1030. Step 1050 may include a step 1052 of mapping the first or subsequent tone-compressed HDR image to the pre-tone-compression bit depth (or to another bit depth that exceeds the pre-tone-compression bit depth).

In embodiments of method 1000 that include step 1032, step 1050 includes step 1054. Step 1054 searches the look-up table for each tone-compressed pixel intensity of the first or subsequent tone-compressed HDR image and reads the corresponding pre-tone-compression pixel intensity, thereby at least approximately re-linearizing the pixel intensities.

Step 1054 may include a step 1056 of interpolating between entries in the look-up table when a tone-compressed pixel intensity of the active pixel data of the first-subsequent tone-compressed HDR image does not equal a tone-compressed pixel intensity listed in the look-up table.

In embodiments of method 1000 that include step 1034, step 1050 includes a step 1058 of applying the polynomial function to the tone-compressed pixel intensities. Step 1050 thereby determines corresponding pre-tone-compression pixel intensities, thus at least approximately re-linearizing the pixel intensities. In embodiments of method 1000 that include step 1036, step 1050 includes a step 1059 of applying the spline representation to the tone-compressed pixel intensities. Step 1050 thereby determines corresponding pre-tone-compression pixel intensities, thus at least approximately re-linearizing the pixel intensities.

Figure 14:
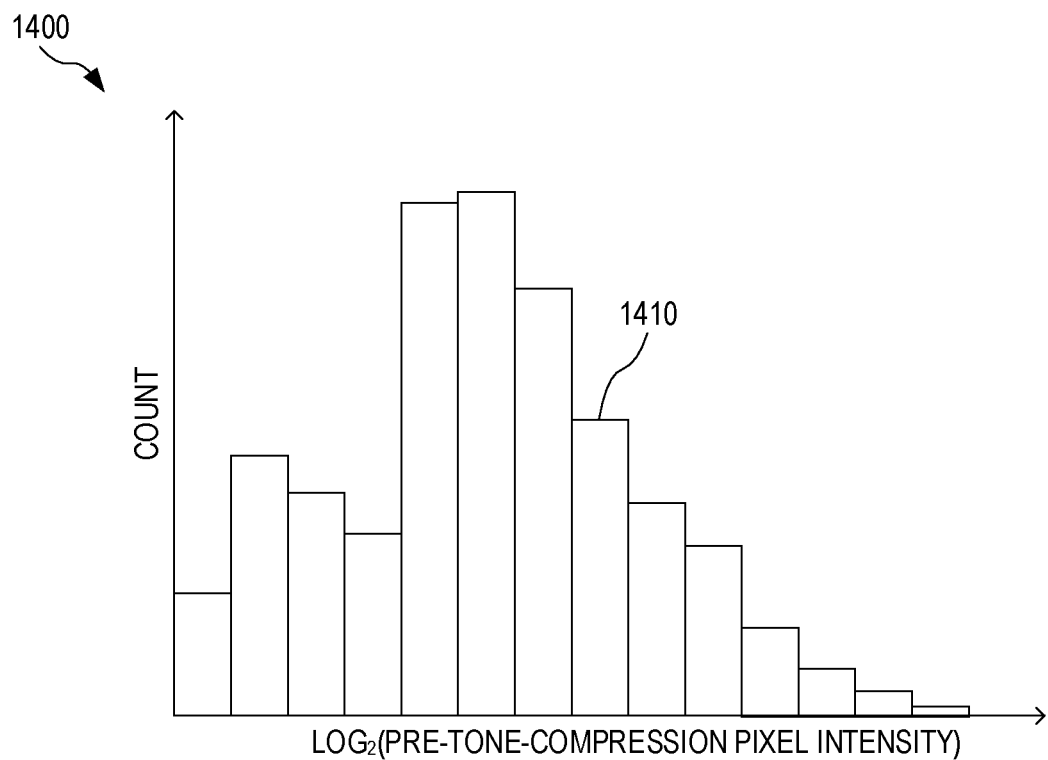
FIGS. 14 and 15 are visual diagrams of another example of a correspondence derivation step of the method of FIG. 10.
Figure 15:
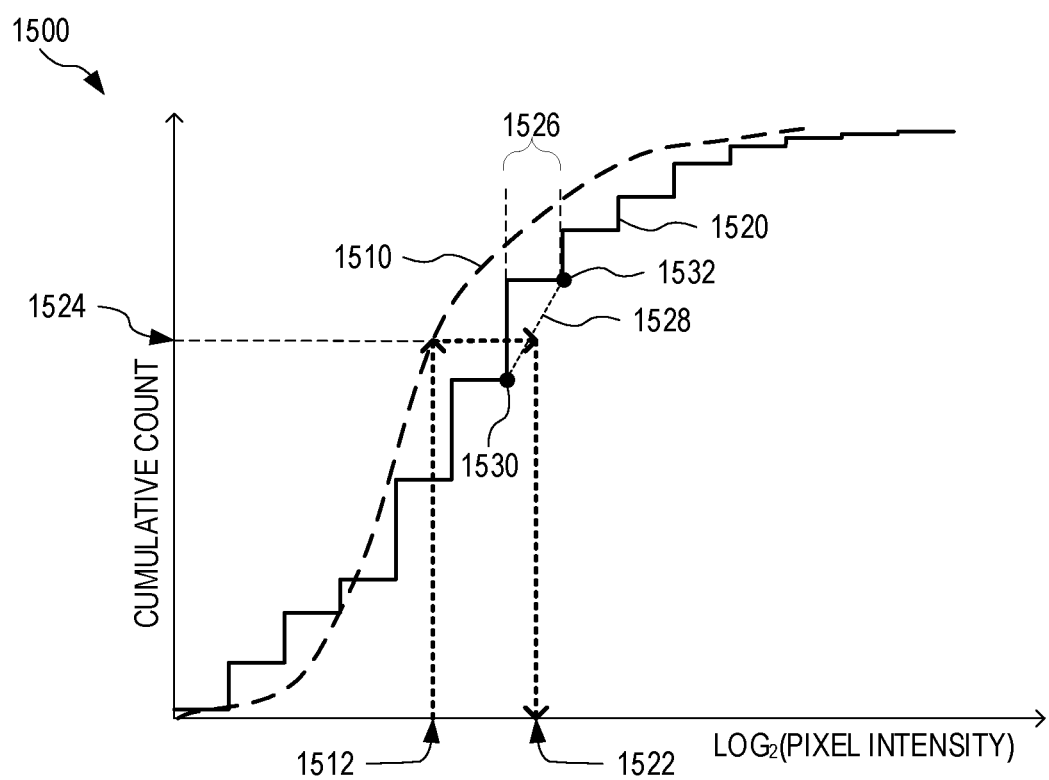

FIGS. 14 and 15 are visual diagrams of another example of step 1030 of method 1000. FIGS. 14 and 15 are best viewed together in the following description. In this example, the histogram of pre-tone-compression pixel intensities obtained in step 920 is binned logarithmically, such that each bin corresponds to $\log_2(v)$, where v is the pre-tone-compression pixel intensity. FIG. 14 shows an example histogram 1400 with logarithmic bins 1410. Histogram 1400 has 14 bins corresponding to HDR images 282 having bit depth of 14 bits. FIG. 15 is a diagram 1500 that is conceptually similar to diagram 1200 except for being based partly upon logarithmically binned histogram 1400. Diagram 1500 plots (a) a CDF 1510 of tone-compressed pixel intensities of active pixel data 310 of a tone-compressed HDR image 284 and (b) a CDF 1520 of histogram 1400. CDF 1520 has a pronounced stepwise behavior due to the logarithmic binning of histogram 1400. Corresponding pairs of tone-compressed and pre-tone-compression pixel intensities may be determined in a manner similar to that discussed above in reference to FIG. 12. A given tone-compressed pixel intensity 1512 corresponds to a CDF value 1524 of CDF 1510.

The corresponding pre-tone-compression pixel intensity 1522 may be determined as a pre-tone-compression pixel intensity within the range 1526 of a step of CDF 1520 across CDF value 1524. The corresponding pre-tone-compression pixel intensity 1522 is, for example, set to a center-value of range 1526. In an alternative example, the distribution of pre-tone-compression pixel intensities within range 1526 is assumed to be linear, as indicated by line 1528, and the corresponding pre-tone-compression pixel intensity 1522 is determined as the pre-tone-compression pixel intensity where line 1528 matches CDF value 1524. In one implementation, using such linear interpolation, the closest nodes 1530 and 1532 of CDF 1520 bracketing CDF value 1524 are found. Lower node 1530 has coordinates ($v_{P,0}$, $CDF_{P,0}$), and upper node 1532 has coordinates ($v_{P,1}$, $CDF_{P,1}$). The pre-tone-compression pixel intensity $v_P$ corresponding to tone-compressed pixel intensity 1512, $u_C(i)$, may then be interpolated according to the expression $$v_P = \frac{CDF_C(u_C(i)) - CDF_{P,0}}{CDF_{P,1} - CDF_{P,0}} \times (v_{P,1} - v_{P,0}) + v_{P,0}.$$

Figure 16:
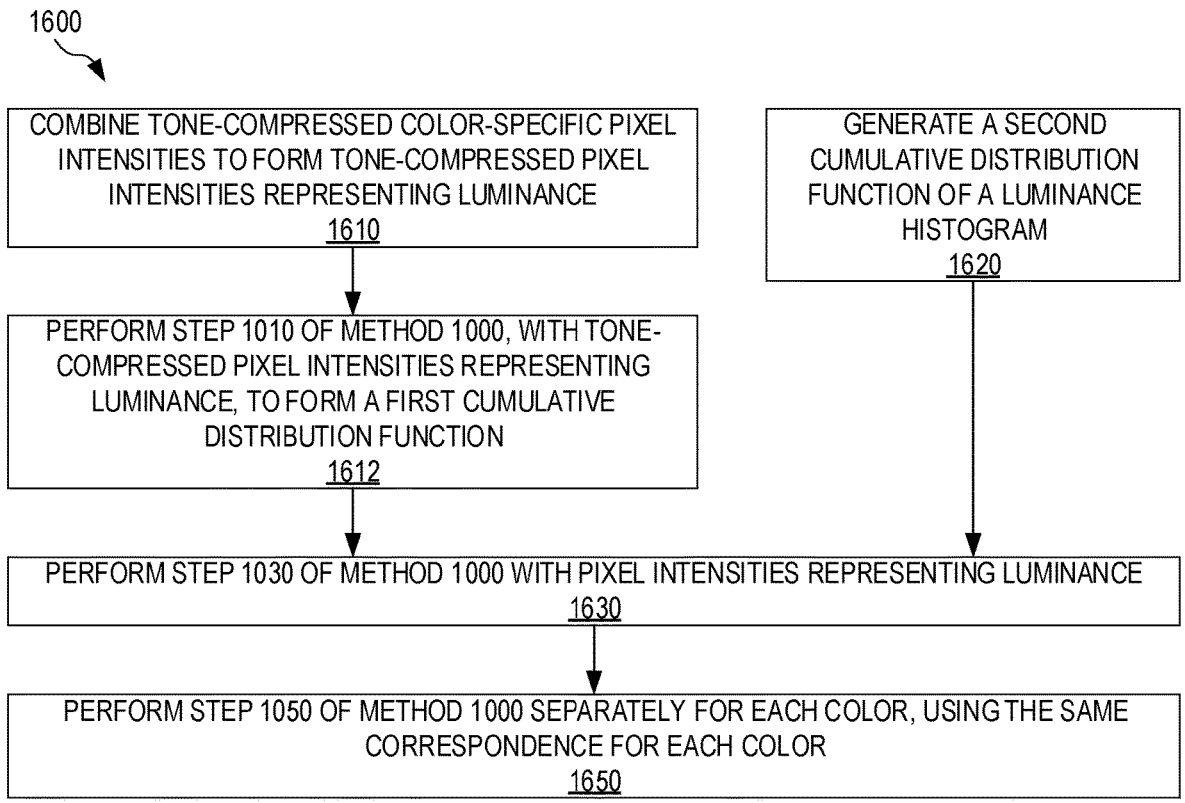
FIG. 16 illustrates an adaptive method for linearizing a tone-compressed HDR color image based upon luminance, according to an embodiment.

FIG. 16 illustrates one adaptive method 1600 for linearizing a tone-compressed HDR color image based upon luminance Method 1600 is an embodiment of method 1000. Method 1600 includes steps 1610, 1612, 1620, 1630, and 1650. Steps 1610, 1612, 1620, and 1630 cooperate to form an embodiment of step 930, of method 900, that may be encoded in correspondence derivation instructions 834. Step 1650 is an embodiment of step 950 of method 900 and may be encoded in linearization instructions 836.

Step 1610 combines tone-compressed color-specific pixel intensities, of a tone-compressed HDR color image, to form tone-compressed pixel intensities representing luminance. In one example of step 1610, red, green, and blue pixel intensities of tone-compressed HDR image 284 are combined to form luminance values corresponding to a tone-compressed HDR luminance image.

Step 1612 takes the luminance values generated in step 1610 as input and performs step 1010 of method 1000, with the tone-compressed pixel intensities representing luminance, to form a first CDF. In one example of step 1612, luminance pixel values generated in step 1610 are processed to generate a luminance-based version of CDF 1210.

Step 1620 generates a second CDF of a luminance histogram. In one example of step 1620, HDR image sensor 110 is configured to output pre-tone-compression histogram 864 as a luminance histogram, and step 1620 forms CDF 1220 of this luminance histogram. In another example of step 1620, HDR image sensor 110 is configured to output a pre-tone-compression histogram 864 for each of several color components of HDR image sensor 110, and step 1620 combines these color-specific histograms to form a luminance histogram before forming CDF 1220 of the luminance histogram.

Step 1630 takes the CDFs generated in steps 1612 and 1620 as input and performs step 1030 of method 1000 with pixel intensities representing luminance. Step 1630 thereby generates a correspondence (e.g., correspondence 522) between tone-compressed luminance and pre-tone-compression luminance Step 1650 performs step 1050 of method 1000 separately for each color, using the same correspondence for each color. In other words, the correspondence between tone-compressed luminance and pre-tone-compression luminance is applied to each color-specific pixel intensity of the tone-compressed HDR color image. In one example of step 1650, (a) tone-compressed red pixel intensities $u_R$ of tone-compressed HDR image 284 are scaled to generate linearized red pixel intensities $v_R$ according to the expression $$v_R = u_R \times (L_P/L_C),$$

wherein $L_C$ is tone-compressed luminance and $L_P$ is the corresponding pre-tone-compression luminance according to the correspondence determined in step 1630, (b) tone-compressed green pixel intensities $u_G$ of tone-compressed HDR image 284 are scaled to generate linearized green pixel intensities $v_G$ according to the expression $$v_G = u_G \times (L_P/L_C),$$

and (c) tone-compressed blue pixel intensities $u_B$ of tone-compressed HDR image 284 are scaled to generate linearized blue pixel intensities $v_B$ according to the expression $$v_B = u_B \times (L_P/L_C).$$

Referring to FIG. 10, the look-up table generated in step 1032 (e.g., correspondence 522) may tabulate the ratio $L_P/L_C$ as a function of $L_C$.

Figure 17:
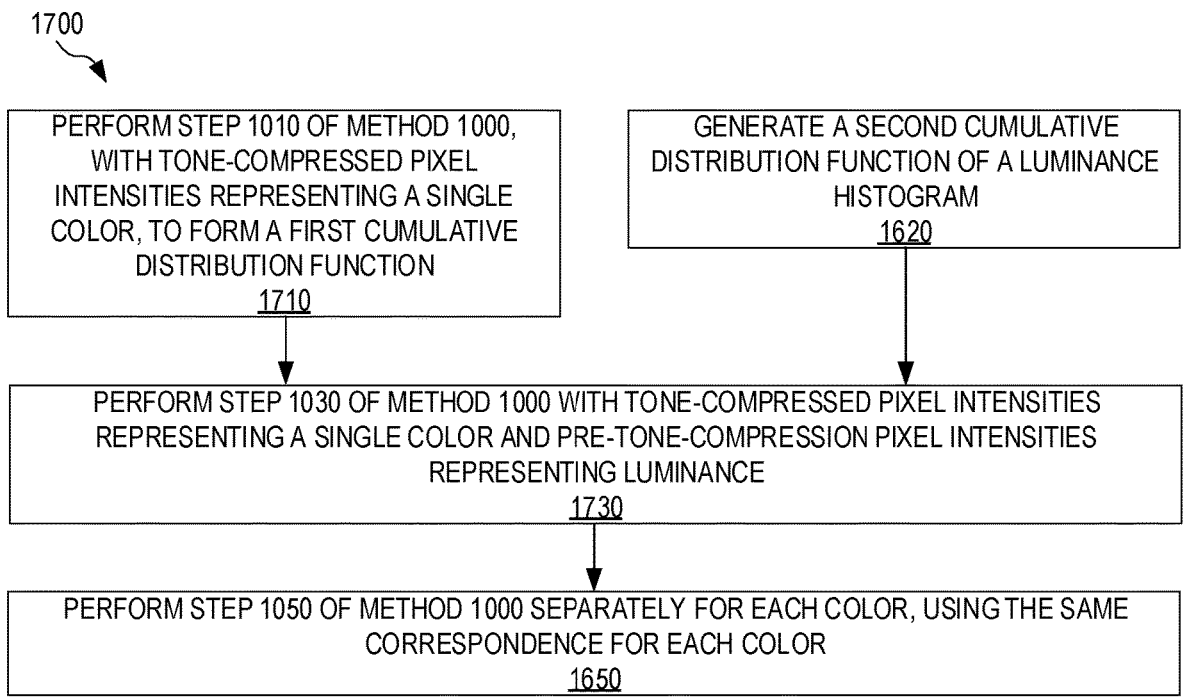
FIG. 17 illustrates an adaptive method for linearizing a tone-compressed HDR color image based upon pre-tone-compression luminance and a single color component of the tone-compressed HDR color image, according to an embodiment.

FIG. 17 illustrates one adaptive method 1700 for linearizing a tone-compressed HDR color image based upon pre-tone-compression luminance and a single color component of the tone-compressed HDR color image. Method 1700 is an embodiment of method 1000. Method 1700 includes steps 1710, 1620, 1730, and 1650. Method 1700 is similar to method 1600 except for step 1710 replacing steps 1610 and 1612, and step 1730 replacing step 1630.

Step 1710 performs step 1010 of method 1000, with the tone-compressed pixel intensities being color-specific pixel intensities representing a single color component of the tone-compressed HDR color image, to form a first CDF. In one example of step 1710, green pixel intensities of active pixel data 310 of tone-compressed HDR image 284 are processed to generate a single-color version of CDF 1210.

Step 1730 takes the CDFs generated in steps 1710 and 1620 as input and performs step 1030 of method 1000 with the tone-compressed pixel intensities representing a single color and the pre-tone-compression pixel intensities representing luminance Step 1730 thereby generates a correspondence (e.g., correspondence 522) between (a) color-specific tone-compressed pixel intensities, for a single-color component, and (b) pre-tone-compression luminance. In method 1700, step 1650 applies the same correspondence to all color components of the tone-compressed HDR color image, even though the correspondence has been determined based upon a single color component of the tone-compressed HDR color image.

Figure 18:
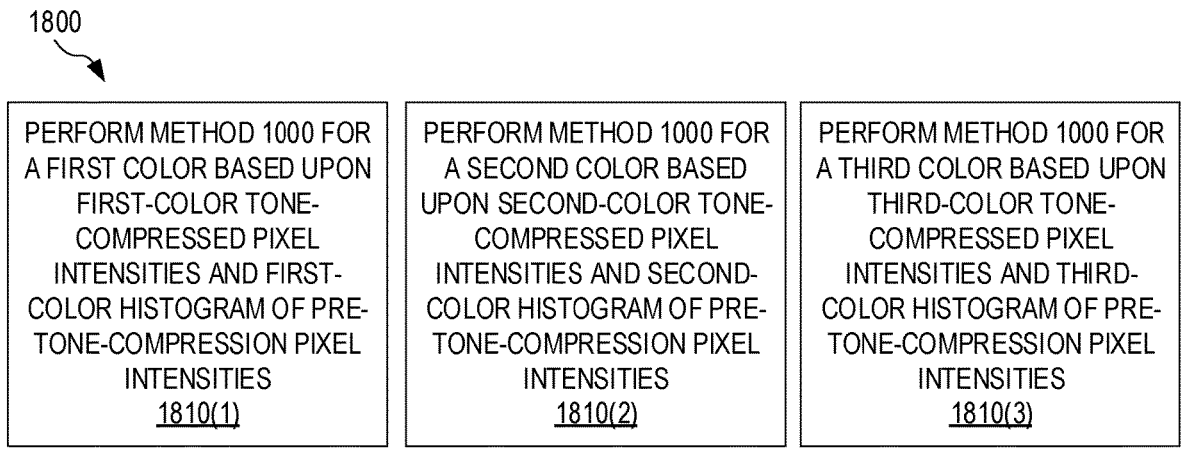
FIG. 18 illustrates an adaptive method for linearizing a tone-compressed HDR color image based upon a separate consideration of each color component, according to an embodiment.

FIG. 18 illustrates one adaptive method 1800 for linearizing a tone-compressed HDR color image based upon a separate consideration of each color component. Method 1800 is an embodiment of method 1000. Method 1800 may be encoded in machine-readable instructions 830. Method 1800 includes three instances of a step 1810. Each instance of step 1810 linearizes a respective color component of the tone-compressed HDR color image according to a correspondence derived exclusively from image data associated with that color component.

Step 1810(1) performs method 1000 for a first color, e.g., red, based upon first-color tone-compressed pixel intensities and first-color histogram of pre-tone-compression pixel intensities. Step 1810(2) performs method 1000 for a second color, e.g., green, based upon second-color tone-compressed pixel intensities and second-color histogram of pre-tone-compression pixel intensities. Step 1810(3) performs method 1000 for a third color, e.g., blue, based upon third-color tone-compressed pixel intensities and third-color histogram of pre-tone-compression pixel intensities. Method 1800 relies on the HDR image sensor providing pre-tone-compression histogram 864 for each color component.

Figure 19:
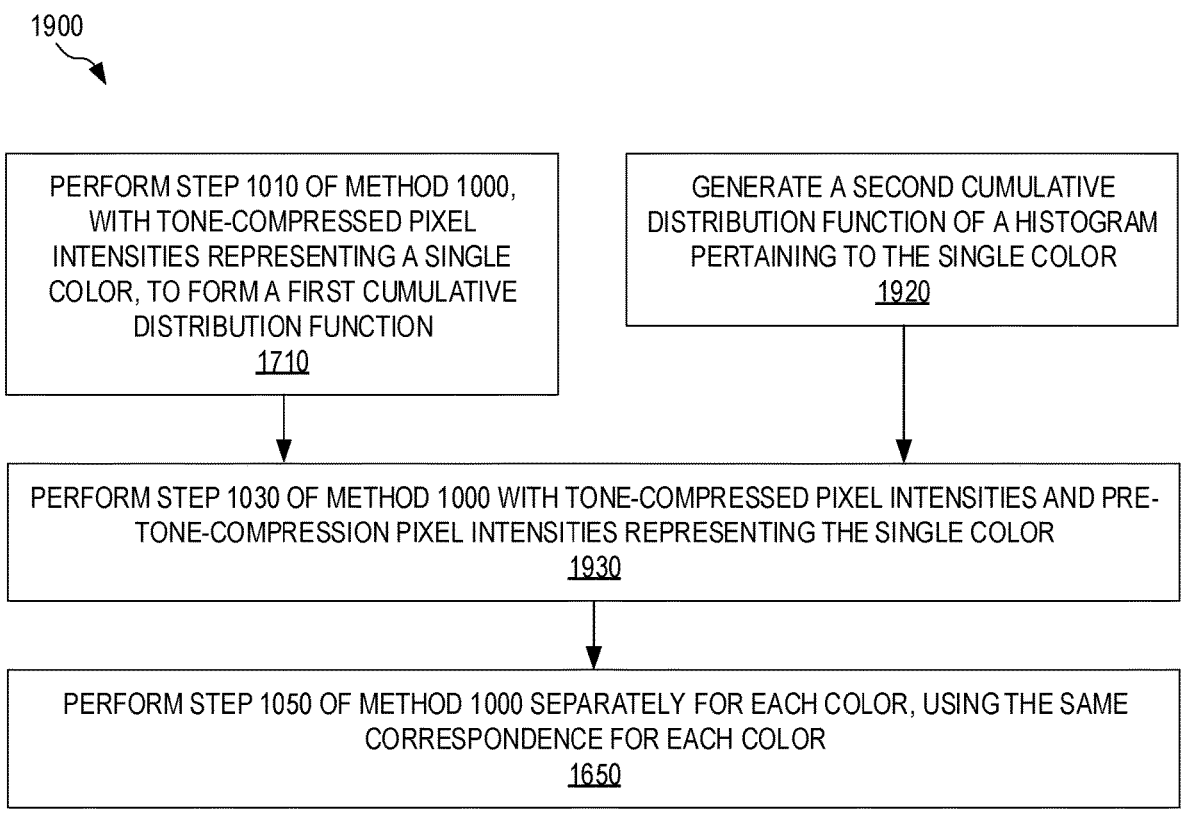
FIG. 19 illustrates an adaptive method for linearizing a tone-compressed HDR color image based in part upon pre-tone-compression pixel intensities of a single color component, according to an embodiment.

FIG. 19 illustrates one adaptive method 1900 for linearizing a tone-compressed HDR color image based in part upon pre-tone-compression pixel intensities of a single color component. Method 1900 is an embodiment of method 1000. Method 1900 includes steps 1710, 1920, 1930, and 1650. Method 1900 is similar to method 1700 except for step 1920 replacing step 1620, and step 1930 replacing step 1730. Step 1920 is similar to step 1620 except for being based upon a pre-tone-compression histogram that is specific to a single color component, e.g., green. Step 1930 takes the CDFs generated in steps 1710 and 1920 as input and performs step 1030 of method 1000 with tone-compressed pixel intensities and pre-tone-compression pixel intensities representing the single color.

FIGS. 20 and 21 illustrate one adaptive method 2000 for determining a correspondence between tone-compressed and pre-tone-compression pixel intensities by deriving a directly-matched partial correspondence between the tone-compressed and pre-tone-compression pixel intensities and then extrapolating the directly-matched correspondence. Method 2000 is an embodiment of step 1030 of method 1000 and may be encoded in linearization instructions 836. FIG. 20 is a flowchart for method 2000, and FIG. 21 is an example diagram illustrating certain elements of method 2000. FIGS. 20 and 21 are best viewed together in the following description.

Method 2000 may be advantageously employed, for example, in situations where the HDR image sensor provides only a partial histogram of the pre-tone-compression pixel intensities and/or in situations where higher pixel intensities are affected by saturation and therefore unsuitable for correspondence derivation. Method 2000 includes steps 2010 and 2020. Step 2010 determines a directly-matched partial correspondence between tone-compressed and pre-tone-compression pixel intensities, and step 2020 extrapolates the directly-matched partial correspondence.

For a partial range of tone-compressed pixel intensities of a tone-compressed HDR image, excluding an uppermost range of the tone-compressed pixel intensities, step 2010 determines a directly-matched-correspondence between the tone-compressed pixel intensities and the pre-tone-compression pixel intensities. In one example, illustrated in FIG. 21, step 2010 determines a directly-matched correspondence 2112 between a CDF (e.g., CDF 1210) of tone-compressed pixel intensities of active pixel data 310 of tone-compressed HDR image 284 and a CDF (e.g., CDF 1220) of pre-tone-compression histogram 864. Directly-matched correspondence 2112 is determined only for tone-compressed pixel intensities below a cut-off pixel intensity 2120.

Step 2020 extrapolates the directly-matched-correspondence, determined in step 2010, through the uppermost range to generate the full correspondence between tone-compressed and pre-tone-compression pixel intensities. In one example of step 2020, illustrated in FIG. 21, step 2020 extrapolates directly-matched correspondence 2112 beyond cut-off pixel intensity 2120 to determine an extrapolated correspondence 2114. Directly-matched correspondence 2112 and extrapolated correspondence 2114 together form a correspondence 2110. Correspondence 2110 covers the full range of tone-compressed pixel intensities. Step 2020 may include either one of steps 1032 and 1034 of method 1000. Step 2020 may use a polynomial fit to or spline representation of directly-matched correspondence 2112, or a portion of directly-matched correspondence 2112 near the cut-off pixel intensity 2120, to determine extrapolated correspondence 2114.

In one embodiment, step 2010 includes steps 2012 and 2013. Step 2012 evaluates at least one of the first tone-compressed image (e.g., tone-compressed HDR image 284) and the first cumulative distribution function (e.g., CDF 1210) to determine a cut-off tone-compressed pixel intensity (e.g., cut-off pixel intensity 2120) that excludes saturated tone-compressed pixel intensities. Step 2013 defines the partial range as a range of tone-compressed pixel intensities no greater than the cut-off tone-compressed pixel intensity (e.g., cut-off pixel intensity 2120).

In another embodiment, step 2010 includes steps 2014 and 2018. Step 2014 evaluates a histogram (e.g., pre-tone-compression histogram 864) of pre-tone-compression pixel intensities, representing only a lower subset of full dynamic range, to determine a cut-off pre-tone-compression pixel intensity. Step 2018 defines the partial range of tone-compressed pixel intensities as the number of lowest tone-compressed pixel intensities that equals the number of pre-tone-compression pixel intensities no greater than the cut-off pre-tone-compression pixel intensity determined in step 2014.

Step 2014 may include a step 2015. Step 2015 sets the cut-off pre-tone-compression pixel intensity to the maximum pixel intensity of the histogram (e.g., the uppermost bin of pre-tone-compression histogram 864 having non-zero counts, or the uppermost bin of histogram 1100 or logarithmic histogram 1400 having non-zero counts). In one example, the histogram is logarithmic and has N bins $B_i$, i=0, 1, . . . , N−1. Each bin $B_i$ corresponds to a pre-tone-compression pixel intensities $2^i$, and the highest bin with non-zero counts is $B_{N_{max}}$, wherein $N_{max}$ is a positive integer no greater than N−1. In this example, the cut-off pre-tone-compression pixel intensity is set to $2^{N_{max}}$.

FIG. 22 illustrates one method 2200 for determining a range for derivation of a directly-matched partial correspondence between the tone-compressed and pre-tone-compression pixel intensities. Method 2200 may be implemented in step 2010 of method 2000. Method 2200 utilizes a logarithmic histogram of pre-tone-compression pixel intensities, such as histogram 1400. Method 2200 includes steps 2210, 2220, 2230, and 2240.

Step 2210 counts the number $N_{SAT}$ of saturated pixels in a tone-compressed HDR image (e.g., tone-compressed HDR image 284). Step 2220 identifies bins of a logarithmic pre-tone-compression histogram (e.g., histogram 1400) containing the $N_{SAT}$ uppermost pre-tone-compression pixel intensities. For example, starting from the highest bin of the logarithmic pre-tone-compression histogram step 2220 may descend down through the bins in the following manner. For each bin of the logarithmic pre-tone-compression histogram, a counting variable is set to $N_{SAT,i}=\min(N_{SAT}, N_i)$, where $N_i$ is the count for the i'th bin, and $N_{SAT}$ reset to $N_{SAT}=N_{SAT}-N_i$. This process continues until $N_{SAT}$ is less than or equal to zero.

Step 2230 takes as input the bins of the logarithmic pre-tone-compression histogram and calculates an average bin thereof. Step 2230 may calculate a geometric mean of the bins identified in step 2220. In one example, the average bin is calculated as $$Bin_{mean} = \frac{\sum N_{SAT,i} \times Bin_i}{\sum N_{SAT,i}},$$

where $Bin_i$ is the bin number for the i'th bin. Step 2240 then limits the range for derivation of a directly-matched partial correspondence between the tone-compressed and pre-tone-compression pixel intensities to bins of the logarithmic pre-tone-compression histogram no greater than the average bin.

Figure 23:
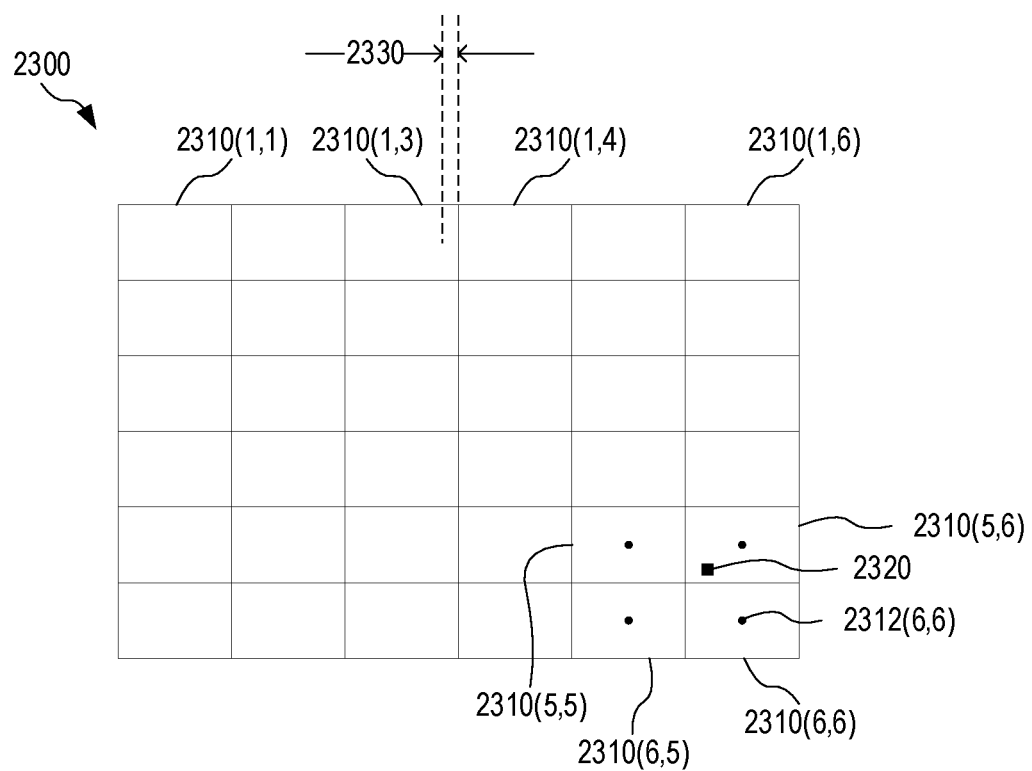
FIG. 23 illustrates an adaptive method for linearizing a tone-compressed HDR image according to a spatially varying correspondence between tone-compressed and pre-tone-compressed pixel intensities, according to an embodiment.

FIG. 23 illustrates one adaptive method 2300 for linearizing a tone-compressed HDR image according to a spatially varying correspondence between tone-compressed and pre-tone-compressed pixel intensities. Method 2300 is an embodiment of steps 920, 930, and 950 of method 900 and may be employed when the HDR image sensor is configured to output a separate pre-tone-compression histogram for each of a plurality of non-overlapping spatial image zones of pre-tone-compression HDR image 282. Method 2300 may be encoded in machine-readable instructions 830.

Method 2300 segregates each of the first and second tone compressed images, discussed above in reference to FIG. 9, into a plurality of non-overlapping spatial image zones 2310. FIG. 23 shows a 6×6 grid of spatial image zones 2310. It is understood that the shaped and/or number of spatial image zones 2310 may differ from that shown in FIG. 23. Method 2300 then repeats steps 920, 930, and 950 of method 900 for each spatial image zone 2310 to determine a separate correspondence between tone-compressed and pre-tone-compression pixel intensities for each spatial image zone 2310. Method 2300 may implement method 1000 when performing steps 930 and 950.

In certain embodiments, method 2300 is configured to smooth the transition between correspondences determined for adjacent spatial image zones 2310. In one such embodiment, method 2300, when performing step 950, includes, at least for each pixel within a threshold distance of a boundary between adjacent spatial image zones 2310, spatially interpolating the correspondence determined for adjacent spatial image zones based upon position of the pixel. For example, for pixels within a region of spatial image zone 2310(1,3) that is less than distance 2330 from spatial image zone 2310(1,4), the correspondence applicable to that pixel may be found by spatial interpolation between the two correspondences determined for spatial image zones 2310(1,3) and 2310(1,4) according to the exact location of the pixel.

In another embodiment, configured to smooth the transition between correspondences determined for adjacent spatial image zones 2310, spatial interpolation is applied to all pixels. In this embodiment, the correspondence determined for each spatial image zone 2310 is assigned to its center location 2316. For each pixel of the tone-compressed HDR image, when method 2300 performs step 950, method 2300 spatially interpolates the correspondence determined for four spatial image zones having respective center location nearest the pixel. For example, for pixel 2320, method 2300 spatially interpolates, from center locations 2316, the four correspondences determined for spatial image zones 2310 (5,5) 2310(5,6), 2310(6,5) and 2310(6,6) to the location of pixel 2320.

Combinations of Features

Features described above as well as those claimed below may be combined in various ways without departing from the scope hereof. For example, it will be appreciated that aspects of one system with or method for adaptive image data linearization, described herein, may incorporate or swap features of another system with or method for adaptive image data linearization described herein. The following examples illustrate some possible, non-limiting combinations of embodiments described above. It should be clear that many other changes and modifications may be made to the methods, products, and systems herein without departing from the spirit and scope of this invention:

(A1) One high-dynamic-range (HDR) camera module with adaptive image data linearization includes an HDR image sensor for generating tone-compressed HDR images of a scene and configured to output the tone-compressed HDR images as respective frames that include active pixel data and metadata. The HDR camera module also includes a processor outside the HDR image sensor, and a memory that is outside the HDR image sensor. The memory stores machine-readable instructions that, when executed by the processor, control the processor to perform steps of: (a) extracting, from a frame of a first tone-compressed HDR image generated by the HDR image sensor, (i) tone-compressed pixel intensities from active pixel data of the frame and (ii) a histogram of pre-tone-compression pixel intensities from metadata of the frame; (b) deriving, from the tone-compressed pixel intensities and the histogram, a correspondence between tone-compressed pixel intensities and pre-tone-compression pixel intensities; and (c) linearizing at least a portion of the active pixel data of a second tone-compressed HDR image, according to the correspondence, to produce a linearized HDR image, the second tone-compressed HDR image being selected from the group consisting of the first tone-compressed HDR image and a subsequent tone-compressed HDR image.

(A2) In the HDR camera module denoted as (A1), the processor and the memory may be implemented in a digital signal processor, and the HDR camera module may further includes an image signal processor communicatively coupled to the digital signal processor for further processing the linearized HDR image by the digital signal processor.

(A3) In the HDR camera module denoted as (A2), the image signal processor may be configured to apply, to the linearized HDR image, one or more procedures selected from the group consisting of white balancing, color correction, gamma correction, demosaicing, noise reduction, and image sharpening.

(A4) In any of the HDR camera modules denoted as (A1) through (A3), the first and second tone-compressed HDR images may be two consecutive images of an HDR video stream outputted by the HDR image sensor.

(A5) In the HDR camera module denoted as (A4), the processor and the memory may be implemented in a digital signal processor that includes a buffer, and the machine-readable instructions may be further configured to control the processor to perform the step of linearizing on subsets of the active pixel data, of the second tone-compressed image, successively stored in the buffer.

(A6) In any of the HDR camera modules denoted as (A1) through (A3), the first and second tone-compressed HDR images may be the same still image, and the machine-readable instructions may be further configured to control the processor to store the active pixel data of the still image in an image storage at least until completion of the step of linearizing.

(A7) In any of the HDR camera modules denoted as (A1) through (A6), the HDR image sensor may include an output interface limited to a output bit depth, the HDR image sensor may be configured to (i) produce linear HDR images at a first bit depth that exceeds the output bit depth and (ii) tone-compress the linear HDR images to generate the tone-compressed HDR images at the output bit depth, and the machine-readable instructions may be configured to control the processor to, in the step of linearizing, map the active pixel data from the output bit depth to the first bit depth.

(A8) In any of the HDR camera modules denoted as (A1) through (A7), the machine-readable instructions may be configured such that the step of deriving includes generating a first cumulative distribution function of the tone-compressed pixel intensities, generating a second cumulative distribution function of the histogram, and determining the correspondence such that, for each of a plurality of corresponding pairs of a tone-compressed pixel intensity and a pre-tone-compression pixel intensity, the first cumulative distribution function evaluated at the tone-compressed pixel intensity equals the second cumulative distribution function evaluated at the pre-tone-compression pixel intensity.

(A9) In the HDR camera module denoted as (A8), the machine-readable instructions may be configured such that the step of determining includes storing, to the memory, a look-up table listing the corresponding pairs, and such that the step of linearizing includes interpolating between entries in the look-up table when a tone-compressed pixel intensity of the active pixel data of the second tone-compressed HDR image does not equal a tone-compressed pixel intensity listed in the look-up table.

(A10) In the HDR camera module denoted as (A8), the machine-readable instructions may be configured such that the step of determining includes, determining the correspondence as a polynomial function specifying the pre-tone-compression pixel intensity as a function of the tone-compressed pixel intensity, and storing parameters of the polynomial function to the memory.

(A11) In the HDR camera module denoted as (A8), the machine-readable instructions may be configured such that the step of determining includes determining the correspondence as a spline representation specifying the pre-tone-compression pixel intensity as a function of the tone-compressed pixel intensity, and storing parameters of the spline representation to the memory.

(A12) In any of the HDR camera modules denoted as (A8) through (A11), the HDR image sensor may be a color image sensor, the histogram may be a luminance histogram, and the machine-readable instructions may be configured such that (I) the step of extracting the tone-compressed pixel intensities includes (a) extracting a plurality of sets of tone-compressed color-specific pixel intensities, each of the sets being specific to a respective color, and (b) combining the sets to form the tone-compressed pixel intensities such that each of the tone-compressed pixel intensities represents a respective pixel luminance; and (II) the step of linearizing includes separately linearizing each color the active pixel data of the second tone-compressed HDR image according to the correspondence.

(A13) In any of the HDR camera modules denoted as (A8) through (A12), the machine-readable instructions may be configured such that the step of determining the correspondence includes (a) for a partial range of tone-compressed pixel intensities excluding an uppermost range of the tone-compressed pixel intensities, determining a directly-matched-correspondence between the tone-compressed pixel intensities and the pre-tone-compression pixel intensities such that, for the corresponding pairs of the tone-compressed pixel intensity and the pre-tone-compression pixel intensity associated with the partial range, the first cumulative distribution function evaluated at the tone-compressed pixel intensity equals the second cumulative distribution function evaluated at the pre-tone-compression pixel intensity, and (b) extrapolating the directly-matched-correspondence through the uppermost range to generate the correspondence.

(A14) In the HDR camera module denoted as (A13), the machine-readable instructions may be configured such that the step of determining the correspondence further includes (a) evaluating at least one of the first tone-compressed image and the first cumulative distribution function to determine a cut-off tone-compressed pixel intensity that excludes saturated tone-compressed pixel intensities, and (b) defining the partial range as a range of tone-compressed pixel intensities no greater than the cut-off tone-compressed pixel intensity.

(A15) In the HDR camera module denoted as (A13), the histogram may be a partial histogram representative of only a partial dynamic range forming a lower subset of a full dynamic range of the first tone-compressed HDR image prior to tone-compression, and the machine-readable instructions may be configured such that the step of determining the correspondence further includes evaluating the histogram to determine a cut-off pre-tone-compression pixel intensity, and defining the partial range as a number of lowest tone-compressed pixel intensities that equals number of pre-tone-compression pixel intensities no greater than the cut-off pre-tone-compression pixel intensity.

(A16) In any of the HDR camera modules denoted as (A1) through (A15), the machine-readable instructions may be configured to, when executed by the processor, control the processor to (a) segregate each of the first and second tone-compressed HDR images into a plurality of non-overlapping spatial image zones, and (b) repeat, for each of the plurality of spatial image zones, performing the steps of extracting the tone-compressed pixel intensities, generating the first cumulative distribution function, extracting the histogram, generating the second cumulative distribution function, determining the correspondence, and linearizing.

(A17) In the HDR camera module denoted as (A16), the machine-readable instructions may be configured such that the step of linearizing includes, at least for each pixel within a threshold distance of a boundary between different ones of the spatial image zones, spatially interpolating the correspondence determined for the different ones of the spatial image zones based upon position of the pixel.

(A18) In the HDR camera module denoted as (A16), each of the spatial image zones may have a respective center location, and the machine-readable instructions may be configured such that the step of linearizing includes, for each pixel and based upon position of the pixel, spatially interpolating the correspondence determined for four spatial image zones having respective center location nearest the pixel.

(B1) One adaptive method for linearizing a tone-compressed HDR image includes (i) receiving, from an HDR image sensor, a frame of a first tone-compressed HDR image, (ii) extracting from the frame (a) tone-compressed pixel intensities from active pixel data of the frame and (b) a histogram of pre-tone-compression pixel intensities from metadata of the frame, (iii) deriving, from the tone-compressed pixel intensities and the histogram, a correspondence between tone-compressed pixel intensities and pre-tone-compression pixel intensities, (iv) receiving, from the HDR image sensor, a frame of a second tone-compressed HDR image, the second tone-compressed HDR image being selected from the group consisting of the first tone-compressed HDR image and a subsequent tone-compressed HDR image, and (v) linearizing at least a portion of active pixel data of the frame of the second tone-compressed HDR image, according to the correspondence, to produce a linearized HDR image.

(B2) In the method denoted as (B1), the first and second tone-compressed HDR images may be consecutive images of an HDR video stream.

(B3) The method denoted as (B2) may further include, prior to the step of linearizing, limiting deviation between the correspondence and a previous correspondence derived for a previously captured pair of images of the HDR video stream.

(B3) In the method denoted as (B1), the first and second tone-compressed HDR images may be the same still image.

(B4) In any of the methods denoted as (B1) through (B3), the tone-compressed pixel intensities may be limited to a compressed bit depth that is less than a pre-tone-compression bit depth, the step of linearizing comprising mapping the active pixel data to the pre-tone-compression bit depth.

(B5) In any of the methods denoted as (B1) through (B4), the step of deriving may include generating a first cumulative distribution function of the tone-compressed pixel intensities, generating a second cumulative distribution function of the histogram, and determining the correspondence such that, for each of a plurality of corresponding pairs of a tone-compressed pixel intensity and a pre-tone-compression pixel intensity, the first cumulative distribution function evaluated at the tone-compressed pixel intensity equals the second cumulative distribution function evaluated at the pre-tone-compression pixel intensity.

(B6) The method denoted as (B5) may include (a) in the step of determining, generating the correspondence as a look-up table listing the corresponding pairs, and (b) in the step of linearizing, interpolating between entries in the look-up table when a tone-compressed pixel intensity of the active pixel data of the second tone-compressed HDR image does not equal a tone-compressed pixel intensity listed in the look-up table.

(B7) The method denoted as (B5) may include, in the step of determining, generating the correspondence as a polynomial function specifying the pre-tone-compression pixel intensity as a function of the tone-compressed pixel intensity.

(B8) The method denoted as (B5) may include, in the step of determining, generating the correspondence as a spline representation specifying the pre-tone-compression pixel intensity as a function of the tone-compressed pixel intensity.

(B9) In any of the methods denoted as (B5) through (B8), the first and second tone-compressed HDR images may be color images, and the histogram may be a luminance histogram.

(B10) The method denoted as (B9) may further include (a) in the step of extracting the tone-compressed pixel intensities, extracting a plurality of sets of tone-compressed color-specific pixel intensities, each of the sets being specific to a respective color, (b) combining the sets to form the tone-compressed pixel intensities such that each of the tone-compressed pixel intensities represents a respective pixel luminance, and (c) in the step of linearizing, separately linearizing each color the active pixel data of the second tone-compressed HDR image according to the correspondence.

(B11) The method denoted as (B9) may further include (a) in the step of extracting the tone-compressed pixel intensities, extracting tone-compressed color-specific pixel intensities specific to a single color that is one color of a plurality of colors making up the first tone-compressed HDR image, (b) in the step of generating, generating the first cumulative distribution function as pertaining to the single color, and (c) in the step of linearizing, separately linearizing each color of the active pixel data of the second tone-compressed HDR image according to the correspondence.

(B12) In any of the methods denoted as (B5) through (B8), the first and second tone-compressed HDR images may be color images, and the method may include performing, separately for each color of the first and second tone-compressed HDR images, the steps of extracting the tone-compressed pixel intensities, generating the first cumulative distribution function, extracting the histogram, generating the second cumulative distribution function, determining the correspondence, and linearizing the at least a portion of the active pixel data of the second tone-compressed HDR image.

(B13) In any of the methods denoted as (B5) through (B8), the first and second tone-compressed HDR images may be color images, and the method may further include (a) in the step of extracting the tone-compressed pixel intensities, extracting tone-compressed color-specific pixel intensities specific to a single color that is one color of a plurality of colors making up the first tone-compressed HDR image, (b) in the step of generating, generating the first cumulative distribution function as pertaining to the single color, (c) in the step of extracting the histogram, extracting a color-specific histogram specific to the single color, (d) in the step of generating, generating the second cumulative distribution function as pertaining to the color-specific histogram; and (e) in the step of linearizing, separately linearizing each color of the active pixel data of the second tone-compressed HDR image according to the correspondence.

(B14) In any of the methods denoted as (B5) through (B13), the step of determining may include (a) for a partial range of tone-compressed pixel intensities excluding an uppermost range of the tone-compressed pixel intensities, determining a directly-matched-correspondence between the tone-compressed pixel intensities and the pre-tone-compression pixel intensities such that, for the corresponding pairs of the tone-compressed pixel intensity and the pre-tone-compression pixel intensity associated with the partial range, the first cumulative distribution function evaluated at the tone-compressed pixel intensity equals the second cumulative distribution function evaluated at the pre-tone-compression pixel intensity, and (b) extrapolating the directly-matched-correspondence through the uppermost range to generate the correspondence.

(B15) In the method denoted as (B14), the step of determining the correspondence may further include evaluating at least one of the first tone-compressed image and the first cumulative distribution function to determine a cut-off tone-compressed pixel intensity that excludes saturated tone-compressed pixel intensities, and defining the partial range as a range of tone-compressed pixel intensities no greater than the cut-off tone-compressed pixel intensity.

(B16) In the method denoted as (B14), the histogram may be a partial histogram representative of only a partial dynamic range forming a lower subset of a full dynamic range of the first tone-compressed HDR image prior to tone-compression, and the step of determining the correspondence may further include evaluating the histogram to determine a cut-off pre-tone-compression pixel intensity, and defining the partial range as a number of lowest tone-compressed pixel intensities that equals number of pre-tone-compression pixel intensities no greater than the cut-off pre-tone-compression pixel intensity.

(B17) In the method denoted as (B16), the cut-off pre-tone-compression pixel intensity may be maximum pixel intensity of the histogram.

(B18) In any of the methods denoted as (B1) through (B17), bins of the histogram may be on a logarithmic scale.

(B19) Any of the methods denoted as (B1) through B18) may further include (a) segregating each of the first and second tone-compressed HDR images into a plurality of non-overlapping spatial image zones, and (b) repeating, for each of the plurality of spatial image zones, performing the steps of extracting the tone-compressed pixel intensities, generating the first cumulative distribution function, extracting the histogram, generating the second cumulative distribution function, determining the correspondence, and linearizing.

(B20) In the method denoted as (B19), the step of linearizing may include, at least for each pixel within a threshold distance of a boundary between different ones of the spatial image zones, spatially interpolating the correspondence determined for the different ones of the spatial image zones based upon position of the pixel.

(B21) In the method denoted as (B19), each of the spatial image zones may have a respective center location, and the step of linearizing may include, for each pixel and based upon position of the pixel, spatially interpolating the correspondence determined for four spatial image zones having respective center location nearest the pixel.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

Various aspects of the present invention may be appreciated from the following enumerated example embodiments (EEEs):

EEE 1. A high-dynamic-range (HDR) camera module with adaptive image data linearization, comprising:
  an HDR image sensor for generating tone-compressed HDR images of a scene and configured to output the tone-compressed HDR images as respective frames that include active pixel data and metadata;
  a processor outside the HDR image sensor; and
  a memory outside the HDR image sensor and storing machine-readable instructions that, when executed by the processor, control the processor to perform steps of:
  (a) extracting, from a frame of a first tone-compressed HDR image generated by the HDR image sensor, (i) tone-compressed pixel intensities from active pixel data of the frame and (ii) a histogram of pre-tone-compression pixel intensities from metadata of the frame;
  (b) deriving, from the tone-compressed pixel intensities and the histogram, a correspondence between tone-compressed pixel intensities and pre-tone-compression pixel intensities; and
  (c) linearizing at least a portion of the active pixel data of a second tone-compressed HDR image, according to the correspondence, to produce a linearized HDR image, the second tone-compressed HDR image being selected from the group consisting of the first tone-compressed HDR image and a subsequent tone-compressed HDR image.

EEE 2. The HDR camera module of EEE 1, the processor and the memory being implemented in a digital signal processor, the HDR camera module further comprising an image signal processor communicatively coupled to the digital signal processor for further processing the linearized HDR image by the digital signal processor.

EEE 3. The HDR camera module of EEE 2, the image signal processor being configured to apply, to the linearized HDR image, one or more procedures selected from the group consisting of white balancing, color correction, gamma correction, demosaicing, noise reduction, and image sharpening.

EEE 4. The HDR camera module of EEE 1, the first and second tone-compressed HDR images being two consecutive images of an HDR video stream outputted by the HDR image sensor.

EEE 5. The HDR camera module of EEE 4, the processor and the memory being implemented in a digital signal processor, the digital signal processor including a buffer, the machine-readable instructions being further configured to control the processor to perform the step of linearizing on subsets of the active pixel data, of the second tone-compressed image, successively stored in the buffer.

EEE 6. The HDR camera module of any EEE 1 to 5, the first and second tone-compressed HDR images being the same still image, the machine-readable instructions being further configured to control the processor to store the active pixel data of the still image in an image storage at least until completion of the step of linearizing.

EEE 7. The HDR camera module of any EEE 1 to 6, the HDR image sensor including an output interface limited to a output bit depth, the HDR image sensor being configured to (i) produce linear HDR images at a first bit depth that exceeds the output bit depth and (ii) tone-compress the linear HDR images to generate the tone-compressed HDR images at the output bit depth, the machine-readable instructions being configured to control the processor to, in the step of linearizing, map the active pixel data from the output bit depth to the first bit depth.

EEE 8. The HDR camera module of any EEE 1 to 7, the machine-readable instructions being configured such that the step of deriving includes:
  generating a first cumulative distribution function of the tone-compressed pixel intensities;
  generating a second cumulative distribution function of the histogram;
  determining the correspondence such that, for each of a plurality of corresponding pairs of a tone-compressed pixel intensity and a pre-tone-compression pixel intensity, the first cumulative distribution function evaluated at the tone-compressed pixel intensity equals the second cumulative distribution function evaluated at the pre-tone-compression pixel intensity.

EEE 9. The HDR camera module of EEE 8, the machine-readable instructions being configured such that:
  the step of determining includes storing, to the memory, a look-up table listing the corresponding pairs; and
  the step of linearizing includes interpolating between entries in the look-up table when a tone-compressed pixel intensity of the active pixel data of the second tone-compressed HDR image does not equal a tone-compressed pixel intensity listed in the look-up table.

EEE 10. The HDR camera module of EEE 8 or EEE 9, the machine-readable instructions being configured such that the step of determining includes:
   determining the correspondence as a polynomial function specifying the pre-tone-compression pixel intensity as a function of the tone-compressed pixel intensity; and
   storing parameters of the polynomial function to the memory.

EEE 11. The HDR camera module of EEE 8 or EEE 9, the machine-readable instructions being configured such that the step of determining includes:
   determining the correspondence as a spline representation specifying the pre-tone-compression pixel intensity as a function of the tone-compressed pixel intensity; and
   storing parameters of the spline representation to the memory.

EEE 12. The HDR camera module of any of EEE 1 to 11, the HDR image sensor being a color image sensor, the histogram being a luminance histogram, the machine-readable instructions being configured such that:
   the step of extracting the tone-compressed pixel intensities includes:
      (a) extracting a plurality of sets of tone-compressed color-specific pixel intensities, each of the sets being specific to a respective color, and
      (b) combining the sets to form the tone-compressed pixel intensities such that each of the tone-compressed pixel intensities represents a respective pixel luminance; and
   the step of linearizing includes separately linearizing each color the active pixel data of the second tone-compressed HDR image according to the correspondence.

EEE 13. The HDR camera module of any EEE 8 to 12, the machine-readable instructions being configured such that the step of determining the correspondence includes:
   for a partial range of tone-compressed pixel intensities excluding an uppermost range of the tone-compressed pixel intensities, determining a directly-matched-correspondence between the tone-compressed pixel intensities and the pre-tone-compression pixel intensities such that, for the corresponding pairs of the tone-compressed pixel intensity and the pre-tone-compression pixel intensity associated with the partial range, the first cumulative distribution function evaluated at the tone-compressed pixel intensity equals the second cumulative distribution function evaluated at the pre-tone-compression pixel intensity; and
   extrapolating the directly-matched-correspondence through the uppermost range to generate the correspondence.

EEE 14. The HDR camera module of EEE 13, the machine-readable instructions being configured such that the step of determining the correspondence further includes:
   evaluating at least one of the first tone-compressed image and the first cumulative distribution function to determine a cut-off tone-compressed pixel intensity that excludes saturated tone-compressed pixel intensities; and
   defining the partial range as a range of tone-compressed pixel intensities no greater than the cut-off tone-compressed pixel intensity.

EEE 15. The HDR camera module of EEE 13, the histogram being a partial histogram representative of only a partial dynamic range forming a lower subset of a full dynamic range of the first tone-compressed HDR image prior to tone-compression, the machine-readable instructions being configured such that the step of determining the correspondence further includes:
   evaluating the histogram to determine a cut-off pre-tone-compression pixel intensity; and
   defining the partial range as a number of lowest tone-compressed pixel intensities that equals number of pre-tone-compression pixel intensities no greater than the cut-off pre-tone-compression pixel intensity.

EEE 16. The HDR camera module of any EEE 1 to 15, the machine-readable instructions being configured to, when executed by the processor, control the processor to:
   segregate each of the first and second tone-compressed HDR images into a plurality of non-overlapping spatial image zones; and
   repeat, for each of the plurality of spatial image zones, performing the steps of extracting the tone-compressed pixel intensities, generating the first cumulative distribution function, extracting the histogram, generating the second cumulative distribution function, determining the correspondence, and linearizing.

EEE 17. The HDR camera module of EEE 16, the machine-readable instructions being configured such that the step of linearizing includes, at least for each pixel within a threshold distance of a boundary between different ones of the spatial image zones, spatially interpolating the correspondence determined for the different ones of the spatial image zones based upon position of the pixel.

EEE 18. The HDR camera module of EEE 16 or 17, each of the spatial image zones having a respective center location, the machine-readable instructions being configured such that the step of linearizing includes, for each pixel and based upon position of the pixel, spatially interpolating the correspondence determined for four spatial image zones having respective center location nearest the pixel.

EEE 19. An adaptive method for linearizing a tone-compressed high-dynamic-range (HDR) image, comprising:
   receiving, from an HDR image sensor, a frame of a first tone-compressed HDR image;
   extracting from the frame (a) tone-compressed pixel intensities from active pixel data of the frame and (b) a histogram of pre-tone-compression pixel intensities from metadata of the frame;
   deriving, from the tone-compressed pixel intensities and the histogram, a correspondence between tone-compressed pixel intensities and pre-tone-compression pixel intensities;
   receiving, from the HDR image sensor, a frame of a second tone-compressed HDR image, the second tone-compressed HDR image being selected from the group consisting of the first tone-compressed HDR image and a subsequent tone-compressed HDR image; and
   linearizing at least a portion of active pixel data of the frame of the second tone-compressed HDR image, according to the correspondence, to produce a linearized HDR image.

EEE 20. The method of EEE 19, the first and second tone-compressed HDR images being consecutive images of an HDR video stream.

EEE 21. The method of EEE 20, further comprising, prior to the step of linearizing, limiting deviation between the correspondence and a previous correspondence derived for a previously captured pair of images of the HDR video stream.

EEE 22. The method of any EEE 19 to 21, the first and second tone-compressed HDR images being the same still image.

EEE 23. The method of any EEE 19 to 22, the tone-compressed pixel intensities being limited to a compressed bit depth that is less than a pre-tone-compression bit depth, the step of linearizing comprising mapping the active pixel data to the pre-tone-compression bit depth.

EEE 24. The method of any EEE 19 to 23, the step of deriving comprising:
generating a first cumulative distribution function of the tone-compressed pixel intensities;
generating a second cumulative distribution function of the histogram; and
determining the correspondence such that, for each of a plurality of corresponding pairs of a tone-compressed pixel intensity and a pre-tone-compression pixel intensity, the first cumulative distribution function evaluated at the tone-compressed pixel intensity equals the second cumulative distribution function evaluated at the pre-tone-compression pixel intensity.

EEE 25. The method of EEE 24, comprising:
in the step of determining, generating the correspondence as a look-up table listing the corresponding pairs; and
in the step of linearizing, interpolating between entries in the look-up table when a tone-compressed pixel intensity of the active pixel data of the second tone-compressed HDR image does not equal a tone-compressed pixel intensity listed in the look-up table.

EEE 26. The method of EEE 24 or EEE 25, comprising, in the step of determining, generating the correspondence as a polynomial function specifying the pre-tone-compression pixel intensity as a function of the tone-compressed pixel intensity.

EEE 27. The method of EEE 24 or EEE 25, comprising, in the step of determining, generating the correspondence as a spline representation specifying the pre-tone-compression pixel intensity as a function of the tone-compressed pixel intensity.

EEE 28. The method of any EEE 24 to 27, the first and second tone-compressed HDR images being color images, the histogram being a luminance histogram.

EEE 29. The method of any EEE 19 to EEE 28, further comprising:
in the step of extracting the tone-compressed pixel intensities, extracting a plurality of sets of tone-compressed color-specific pixel intensities, each of the sets being specific to a respective color;
combining the sets to form the tone-compressed pixel intensities such that each of the tone-compressed pixel intensities represents a respective pixel luminance; and
in the step of linearizing, separately linearizing each color the active pixel data of the second tone-compressed HDR image according to the correspondence.

EEE 30. The method of any EEE 19 to EEE 28, further comprising:
in the step of extracting the tone-compressed pixel intensities, extracting tone-compressed color-specific pixel intensities specific to a single color that is one color of a plurality of colors making up the first tone-compressed HDR image;
in the step of generating, generating the first cumulative distribution function as pertaining to the single color; and
in the step of linearizing, separately linearizing each color of the active pixel data of the second tone-compressed HDR image according to the correspondence.

EEE 31. The method of any EEE 24 to EEE 30, the first and second tone-compressed HDR images being color images, the method comprising performing, separately for each color of the first and second tone-compressed HDR images, the steps of extracting the tone-compressed pixel intensities, generating the first cumulative distribution function, extracting the histogram, generating the second cumulative distribution function, determining the correspondence, and linearizing the at least a portion of the active pixel data of the second tone-compressed HDR image.

EEE 32. The method of any EEE 24 to EEE 31, the first and second tone-compressed HDR images being color images, the method further comprising:
in the step of extracting the tone-compressed pixel intensities, extracting tone-compressed color-specific pixel intensities specific to a single color that is one color of a plurality of colors making up the first tone-compressed HDR image;
in the step of generating, generating the first cumulative distribution function as pertaining to the single color;
in the step of extracting the histogram, extracting a color-specific histogram specific to the single color;
in the step of generating, generating the second cumulative distribution function as pertaining to the color-specific histogram; and
in the step of linearizing, separately linearizing each color of the active pixel data of the second tone-compressed HDR image according to the correspondence.

EEE 33. The method of EEE 24 to EEE 32, the step of determining comprising:
for a partial range of tone-compressed pixel intensities excluding an uppermost range of the tone-compressed pixel intensities, determining a directly-matched-correspondence between the tone-compressed pixel intensities and the pre-tone-compression pixel intensities such that, for the corresponding pairs of the tone-compressed pixel intensity and the pre-tone-compression pixel intensity associated with the partial range, the first cumulative distribution function evaluated at the tone-compressed pixel intensity equals the second cumulative distribution function evaluated at the pre-tone-compression pixel intensity; and
extrapolating the directly-matched-correspondence through the uppermost range to generate the correspondence.

EEE 34. The method of EEE 33, the step of determining the correspondence further comprising:
evaluating at least one of the first tone-compressed image and the first cumulative distribution function to determine a cut-off tone-compressed pixel intensity that excludes saturated tone-compressed pixel intensities; and
defining the partial range as a range of tone-compressed pixel intensities no greater than the cut-off tone-compressed pixel intensity.

EEE 35. The method of EEE 33 or EEE 34, the histogram being a partial histogram representative of only a partial dynamic range forming a lower subset of a full dynamic range of the first tone-compressed HDR image prior to tone-compression, the step of determining the correspondence further comprising:
evaluating the histogram to determine a cut-off pre-tone-compression pixel intensity; and
defining the partial range as a number of lowest tone-compressed pixel intensities that equals number of pre-tone-compression pixel intensities no greater than the cut-off pre-tone-compression pixel intensity.

EEE 36. The method of EEE 35, the cut-off pre-tone-compression pixel intensity being maximum pixel intensity of the histogram.

EEE 37. The method of any EEE 33 to EEE 36, bins of the histogram being on a logarithmic scale.

EEE 38. The method of any EEE 19 to EEE 37, further comprising:
segregating each of the first and second tone-compressed HDR images into a plurality of non-overlapping spatial image zones; and
repeating, for each of the plurality of spatial image zones, performing the steps of extracting the tone-compressed pixel intensities, generating the first cumulative distribution function, extracting the histogram, generating the second cumulative distribution function, determining the correspondence, and linearizing.

EEE 39. The method of EEE 38, the step of linearizing comprising, at least for each pixel within a threshold distance of a boundary between different ones of the spatial image zones, spatially interpolating the correspondence determined for the different ones of the spatial image zones based upon position of the pixel.

EEE 40. The method of EEE 38 or EEE 39, each of the spatial image zones having a respective center location, the step of linearizing comprising, for each pixel and based upon position of the pixel, spatially interpolating the correspondence determined for four spatial image zones having respective center location nearest the pixel.

EEE 41. The HDR camera module of any of EEE 1 to EEE 18, wherein the HDR image sensor is configured to output the tone-compressed HDR images as respective frames that include active pixel data and metadata comprising a histogram of pre-tone-compression pixel intensities.

EEE 42. The HDR camera module of any of EEE 1 to EEE 18 or EEE 41, wherein the histogram of pre-tone-compression pixel intensities extracted from the first tone-compressed HDR image generated by the HDR image sensor is provided in the metadata of the frame of the first tone-compressed HDR image.

EEE 43. An electronic device comprising the HDR camera module of any of EEE 1 to EEE 18 or EEE 41 to EEE 42.

EEE 44. A mobile device comprising the HDR camera module of any of EEE 1 to EEE 18 or EEE 41 to EEE 42.

EEE 45. The electronic device of EEE 43 or the mobile device of EEE 44, further comprising a housing, wherein the HDR camera module is arranged in the housing.

EEE 46. The method of any of EEE 19 to EEE 40, wherein the histogram of pre-tone-compression pixel intensities extracted from the frame of the first tone-compressed HDR image is provided in the metadata of the frame of the first tone-compressed HDR image.

EEE 47. A non-transitory computer-readable storage medium having stored thereon instructions that, when executed by a processor, control the processor to perform the method of any of EEE 19 to EEE 40 or EEE 46.

The invention claimed is:

1. A high-dynamic-range (HDR) camera module with adaptive image data linearization, comprising:
an HDR image sensor for generating tone-compressed HDR images of a scene and configured to output the tone-compressed HDR images as respective frames that include active pixel data and metadata;
a processor outside the HDR image sensor; and
a memory outside the HDR image sensor and storing machine-readable instructions that, when executed by the processor, control the processor to perform steps of:
(a) extracting, from a frame of a first tone-compressed HDR image generated by the HDR image sensor, (i) tone-compressed pixel intensities from active pixel data of the frame and (ii) a histogram of pre-tone-compression pixel intensities from metadata of the frame;
(b) deriving, from the tone-compressed pixel intensities and the histogram, a correspondence between tone-compressed pixel intensities and pre-tone-compression pixel intensities; and
(c) linearizing at least a portion of the active pixel data of a second tone-compressed HDR image, according to the correspondence, to produce a linearized HDR image, the second tone-compressed HDR image being selected from the group consisting of the first tone-compressed HDR image and a subsequent tone-compressed HDR image.

2. The HDR camera module of claim 1, the processor and the memory being implemented in a digital signal processor, the HDR camera module further comprising an image signal processor communicatively coupled to the digital signal processor for further processing the linearized HDR image by the digital signal processor.

3. The HDR camera module of claim 2, the image signal processor being configured to apply, to the linearized HDR image, one or more procedures selected from the group consisting of white balancing, color correction, gamma correction, demosaicing, noise reduction, and image sharpening.

4. The HDR camera module of claim 1, the first and second tone-compressed HDR images being two consecutive images of an HDR video stream outputted by the HDR image sensor.

5. The HDR camera module of claim 4, the processor and the memory being implemented in a digital signal processor, the digital signal processor including a buffer, the machine-readable instructions being further configured to control the processor to perform the step of linearizing on subsets of the active pixel data, of the second tone-compressed image, successively stored in the buffer.

6. The HDR camera module of claim 1, the first and second tone-compressed HDR images being the same still image, the machine-readable instructions being further configured to control the processor to store the active pixel data of the still image in an image storage at least until completion of the step of linearizing.

7. The HDR camera module of claim 1, the HDR image sensor including an output interface limited to a output bit depth, the HDR image sensor being configured to (i) produce linear HDR images at a first bit depth that exceeds the output bit depth and (ii) tone-compress the linear HDR images to generate the tone-compressed HDR images at the output bit depth, the machine-readable instructions being configured to control the processor to, in the step of linearizing, map the active pixel data from the output bit depth to the first bit depth.

8. The HDR camera module of claim 1, the machine-readable instructions being configured such that the step of deriving includes:
generating a first cumulative distribution function of the tone-compressed pixel intensities;
generating a second cumulative distribution function of the histogram; and
determining the correspondence such that, for each of a plurality of corresponding pairs of a tone-compressed pixel intensity and a pre-tone-compression pixel intensity, the first cumulative distribution function evaluated at the tone-compressed pixel intensity equals the second cumulative distribution function evaluated at the pre-tone-compression pixel intensity.

9. The HDR camera module of claim 8, the machine-readable instructions being configured such that:
the step of determining includes storing, to the memory, a look-up table listing the corresponding pairs; and
the step of linearizing includes interpolating between entries in the look-up table when a tone-compressed pixel intensity of the active pixel data of the second tone-compressed HDR image does not equal a tone-compressed pixel intensity listed in the look-up table.

10. The HDR camera module of claim 8, the machine-readable instructions being configured such that the step of determining includes:
determining the correspondence as a polynomial function specifying the pre-tone-compression pixel intensity as a function of the tone-compressed pixel intensity; and
storing parameters of the polynomial function to the memory.

11. The HDR camera module of claim 8, the machine-readable instructions being configured such that the step of determining includes:
determining the correspondence as a spline representation specifying the pre-tone-compression pixel intensity as a function of the tone-compressed pixel intensity; and
storing parameters of the spline representation to the memory.

12. The HDR camera module of claim 1, the HDR image sensor being a color image sensor, the histogram being a luminance histogram, the machine-readable instructions being configured such that:
the step of extracting the tone-compressed pixel intensities includes:
(a) extracting a plurality of sets of tone-compressed color-specific pixel intensities, each of the sets being specific to a respective color, and
(b) combining the sets to form the tone-compressed pixel intensities such that each of the tone-compressed pixel intensities represents a respective pixel luminance; and
the step of linearizing includes separately linearizing each color of the active pixel data of the second tone-compressed HDR image according to the correspondence.

13. The HDR camera module of claim 8, the machine-readable instructions being configured such that the step of determining the correspondence includes:
for a partial range of tone-compressed pixel intensities excluding an uppermost range of the tone-compressed pixel intensities, determining a directly-matched-correspondence between the tone-compressed pixel intensities and the pre-tone-compression pixel intensities such that, for the corresponding pairs of the tone-compressed pixel intensity and the pre-tone-compression pixel intensity associated with the partial range, the first cumulative distribution function evaluated at the tone-compressed pixel intensity equals the second cumulative distribution function evaluated at the pre-tone-compression pixel intensity; and
extrapolating the directly-matched-correspondence through the uppermost range to generate the correspondence.

14. The HDR camera module of claim 13, the machine-readable instructions being configured such that the step of determining the correspondence further includes:
evaluating at least one of the first tone-compressed image and the first cumulative distribution function to determine a cut-off tone-compressed pixel intensity that excludes saturated tone-compressed pixel intensities; and
defining the partial range as a range of tone-compressed pixel intensities no greater than the cut-off tone-compressed pixel intensity.

15. The HDR camera module of claim 13, the histogram being a partial histogram representative of only a partial dynamic range forming a lower subset of a full dynamic range of the first tone-compressed HDR image prior to tone-compression, the machine-readable instructions being configured such that the step of determining the correspondence further includes:
evaluating the histogram to determine a cut-off pre-tone-compression pixel intensity; and
defining the partial range as a number of lowest tone-compressed pixel intensities that equals number of pre-tone-compression pixel intensities no greater than the cut-off pre-tone-compression pixel intensity.

16. The HDR camera module of claim 8, the machine-readable instructions being configured to, when executed by the processor, control the processor to:
segregate each of the first and second tone-compressed HDR images into a plurality of non-overlapping spatial image zones; and
repeat, for each of the plurality of spatial image zones, performing the steps of extracting the tone-compressed pixel intensities, generating the first cumulative distribution function, extracting the histogram, generating the second cumulative distribution function, determining the correspondence, and linearizing.

17. The HDR camera module of claim 16, the machine-readable instructions being configured such that the step of linearizing includes, at least for each pixel within a threshold distance of a boundary between different ones of the spatial image zones, spatially interpolating the correspondence determined for the different ones of the spatial image zones based upon position of the pixel.

18. The HDR camera module of claim 16, each of the spatial image zones having a respective center location, the machine-readable instructions being configured such that the step of linearizing includes, for each pixel and based upon position of the pixel, spatially interpolating the correspondence determined for four spatial image zones having respective center location nearest the pixel.

19. The HDR camera module of claim 1, wherein the HDR image sensor is configured to output the tone-compressed HDR images as respective frames that include active pixel data and metadata comprising a histogram of pre-tone-compression pixel intensities.

20. The HDR camera module of claim 1, wherein the histogram of pre-tone-compression pixel intensities extracted from the first tone-compressed HDR image generated by the HDR image sensor is provided in the metadata of the frame of the first tone-compressed HDR image.

21. An adaptive method for linearizing a tone-compressed high-dynamic-range (HDR) image, comprising:
receiving, from an HDR image sensor, a frame of a first tone-compressed HDR image;
extracting from the frame (a) tone-compressed pixel intensities from active pixel data of the frame and (b) a histogram of pre-tone-compression pixel intensities from metadata of the frame;
deriving, from the tone-compressed pixel intensities and the histogram, a correspondence between tone-compressed pixel intensities and pre-tone-compression pixel intensities;

receiving, from the HDR image sensor, a frame of a second tone-compressed HDR image, the second tone-compressed HDR image being selected from the group consisting of the first tone-compressed HDR image and a subsequent tone-compressed HDR image; and linearizing at least a portion of active pixel data of the frame of the second tone-compressed HDR image, according to the correspondence, to produce a linearized HDR image.

22. The method of claim 21, wherein the histogram of pre-tone-compression pixel intensities extracted from the frame of the first tone-compressed HDR image is provided in the metadata of the frame of the first tone-compressed HDR image.

23. A non-transitory computer-readable storage medium having stored thereon instructions that, when executed by a processor, control the processor to perform the method of claim 21.

* * * * *